United States Patent [19]
Ohtsuka

[11] Patent Number: 5,231,446
[45] Date of Patent: Jul. 27, 1993

[54] RED-EYE PREVENTING DEVICE

[75] Inventor: Masanori Ohtsuka, Kanagawa, Japan

[73] Assignee: Canon Kabushiki Kaisha, Tokyo, Japan

[21] Appl. No.: 673,197

[22] Filed: Mar. 21, 1991

[30] Foreign Application Priority Data

| Mar. 26, 1990 | [JP] | Japan | 2-073358 |
| Mar. 30, 1990 | [JP] | Japan | 2-080844 |
| Mar. 30, 1990 | [JP] | Japan | 2-086168 |
| Mar. 30, 1990 | [JP] | Japan | 2-086169 |

[51] Int. Cl.$^5$ ........................ G03B 15/03; G03B 17/40
[52] U.S. Cl. .................................... 354/415; 354/137; 354/267.1
[58] Field of Search ................ 354/400, 415, 465, 471, 354/137, 267.1, 268, 238.1, 289.1, 289.12, 195.1, 195.12

[56] References Cited

U.S. PATENT DOCUMENTS

| 4,285,588 | 8/1981 | Mir | 354/137 |
| 4,557,578 | 12/1985 | Seely | 354/400 |
| 4,999,663 | 3/1991 | Nakamura | 354/415 |

Primary Examiner—W. B. Perkey
Attorney, Agent, or Firm—Robin, Blecker, Daley & Driscoll

[57] ABSTRACT

A red-eye preventing device for preventing a red-eye phenomenon by projecting red-eye preventing illumination light onto a subject prior to execution of flash photography. The device includes a red-eye preventing illumination part for projecting the red-eye preventing illumination light, a time counting circuit for counting a predetermined time required to attain a red-eye preventing effect by the red-eye preventing illumination part, an inhibiting circuit for inhibiting a camera from proceeding to a photographic operation until the time counting circuit completes counting the predetermined time, a setting circuit for setting the predetermined time to be counted by the time counting circuit in accordance with the kind of photographic mode of the camera so as to shorten a release time lag, and an indicating part for indicating that the time counting circuit is counting the predetermined time, in a form according to the photographic mode of the camera.

70 Claims, 16 Drawing Sheets

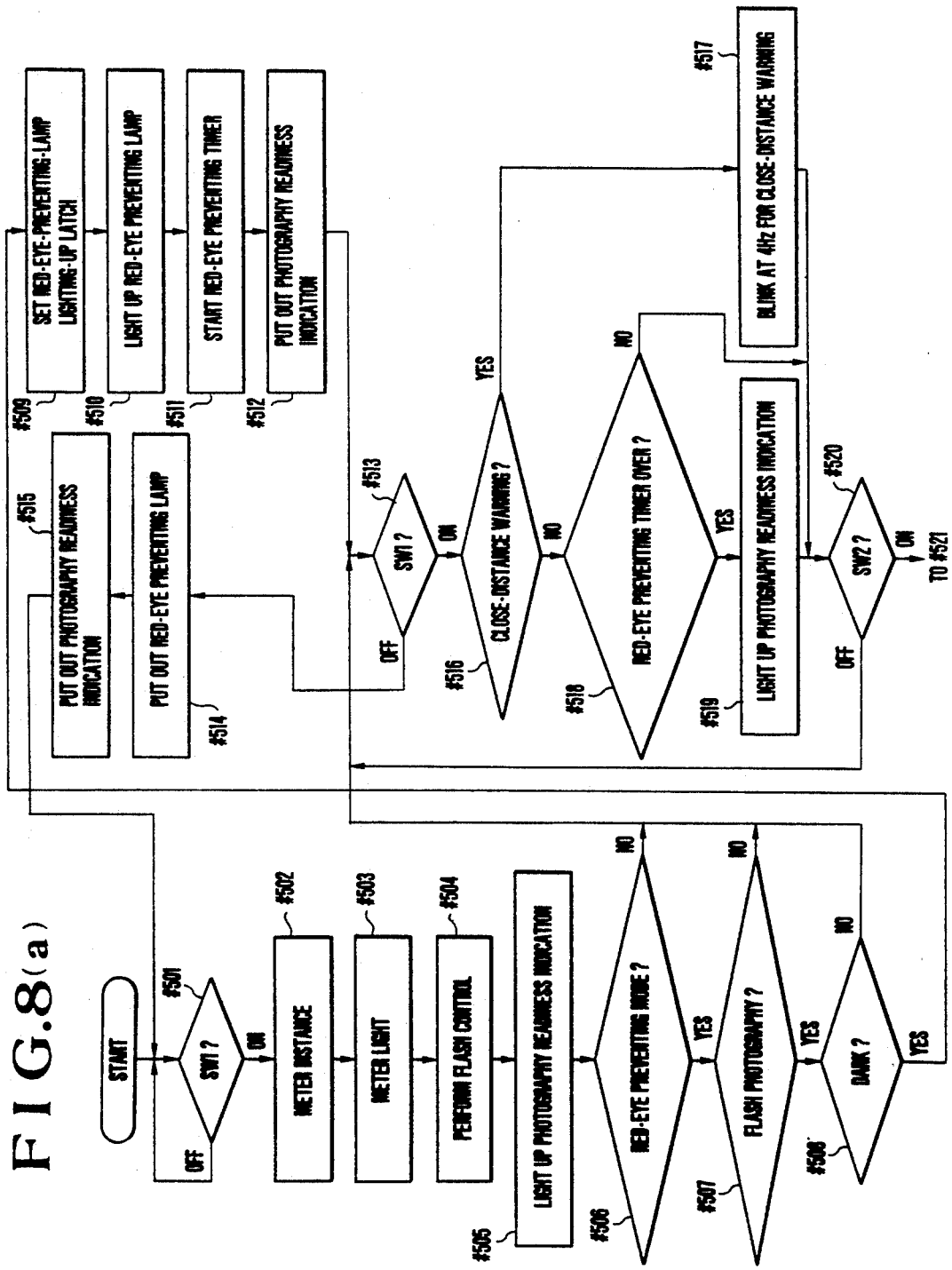

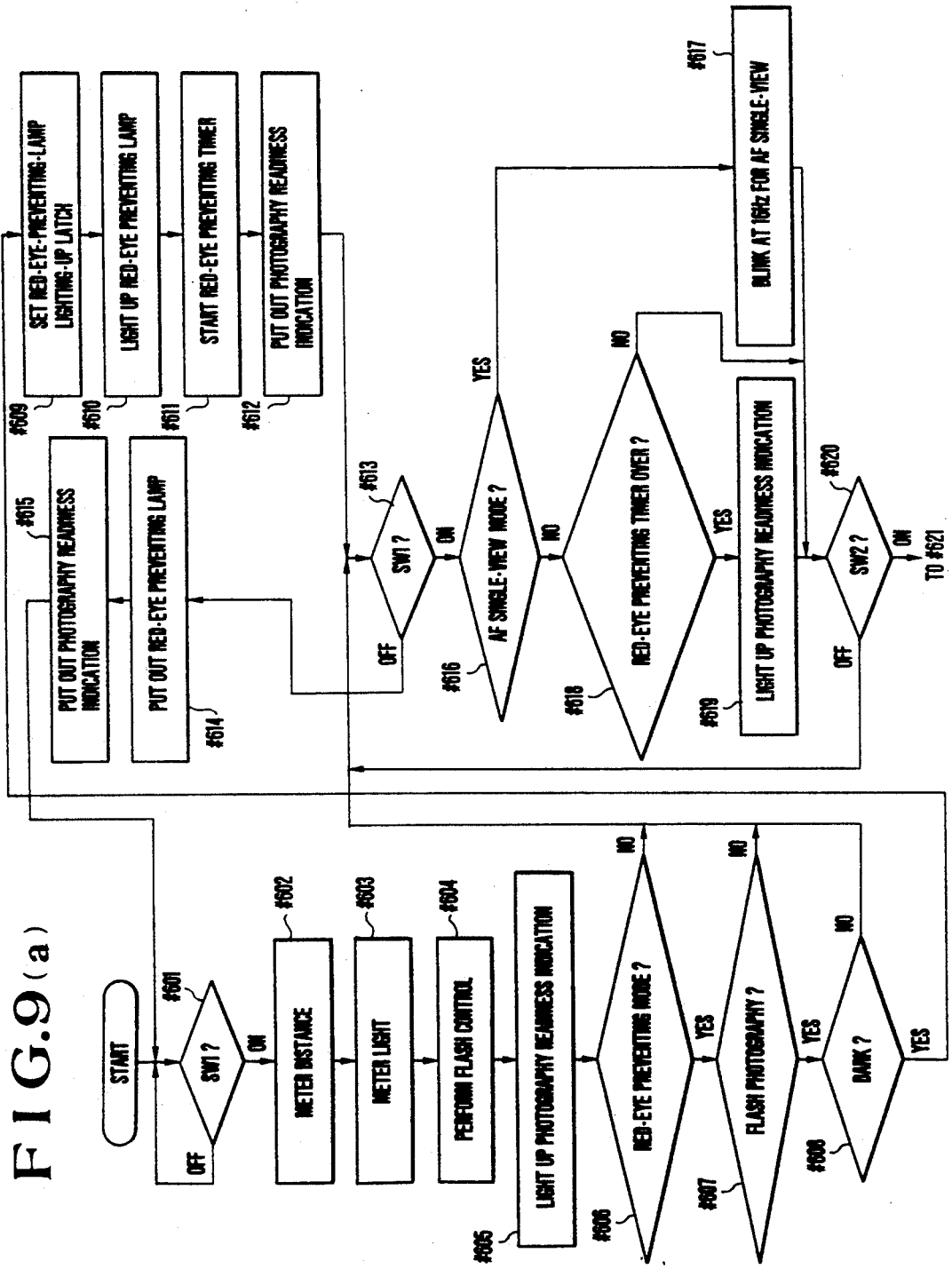

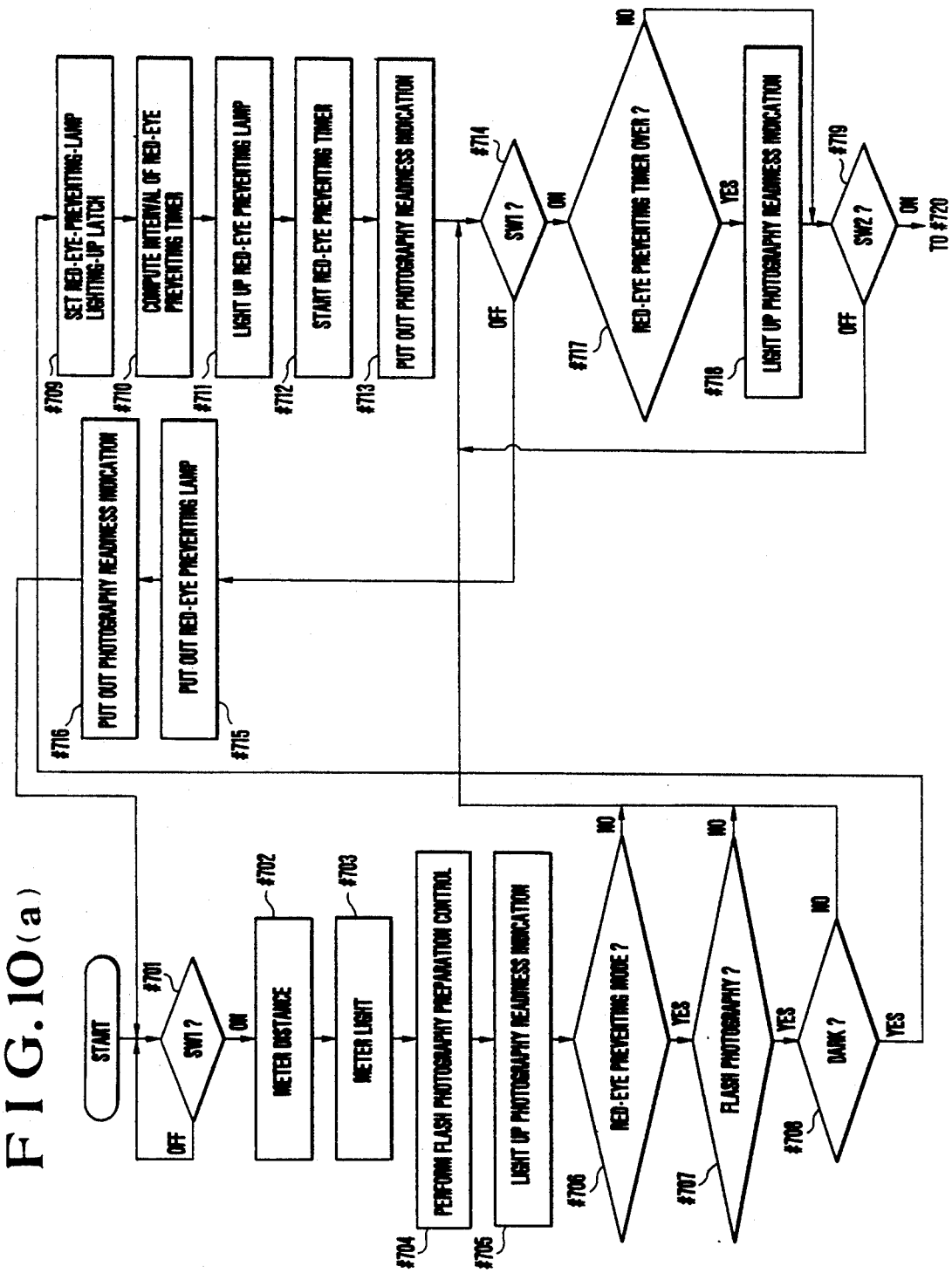

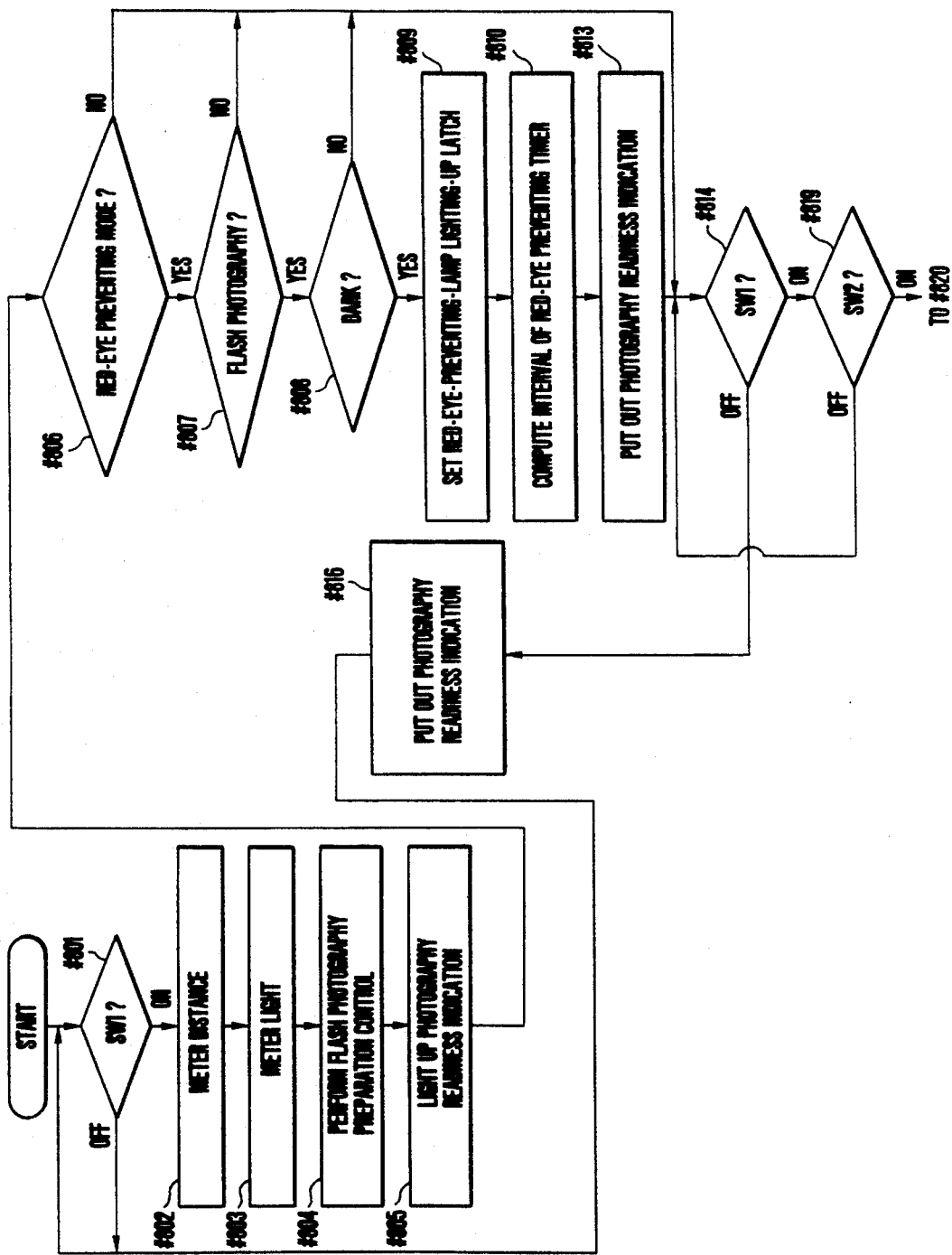

RED-EYE PREVENTING DEVICE

BACKGROUND OF THE INVENTION

1. Field of the Invention

The present invention relates to a red-eye preventing device for preventing a red-eye phenomenon from occurring during flash photography.

1. Description of the Related Art

It has conventionally been pointed out that if flash photography is performed when the luminance of the vicinity of a subject is low, a so-called red-eye phenomenon occurs in which a person or an animal is photographed with the eyes shining in red or gold. It is considered that the red-eye phenomenon is caused by the fact that flash light passing through the pupils of the eyes is intensively reflected by the retina so that the eyes are photographed in red or gold on a film because the color of the blood in the retina is red.

Such a red-eye phenomenon occurs during flash photography, and it is known that it is apt to occur particularly under the following conditions: (1) a case where the vicinity of a subject is dark and the pupils are open; (2) a case where the distance between the flashing part of a flash unit and the optical axis of a photographic lens is close; and (3) a case where the foci of the eyes of a subject are offset (the subject turns away or looks at an object other than a camera).

As a countermeasure against the red-eye phenomenon, Japanese Patent Publication No. Sho 58-48088 discloses the art of preventing the red-eye phenomenon due to flash photography by projecting preliminary illumination light onto a subject prior to execution of the flash photography to reduce the aperture of the pupils of the subject and effecting flashing for photography when the aperture of the pupils is substantially minimized.

Japanese Laid-open Patent Application No. Hei 1-244436 discloses an art which is intended to set a red-eye preventing mode whenever a self-timer mode is set. In the art, after a shutter release button has been pressed all the way down and a self-timer has completed counting time, a flash unit effects preliminary flashing, and after a predetermined time has passed, a shutter release with main flashing is carried out, thereby preventing the red-eye phenomenon due to flash photography.

However, the art of Japanese Patent Publication No. Sho 58-48088 has a number of drawbacks. In this art, to attain a red eye preventing effect, a series of shutter release operations is carried out after the passage of the predetermined time (the light reaction of the eyes) required to substantially close the pupils to the minimum extent. As a result, a photographer is forced to perform an extremely complicated operation, such as the operation of keeping the shutter release button pressed halfway down or keeping a release lock active for a predetermined time by means of a timer circuit. In some cases, a shutter opportunity may be missed because of the release lock.

The art of Japanese Laid-open Patent Application No. Hei 1-244436 also has a number of drawbacks. In this art, the flash unit performs preliminary flashing after the completion of the time counting operation of the self-timer and a photographic operation is carried out when the predetermined time has passed. However, since such a red-eye preventing operation utilizing the preliminary flashing is executed or inhibited in accordance with whether flash photography or normal photography has been selected, variations occur in a time period which passes from the time the self-timer starts counting time until photography is effected. The result is an indication which is extremely difficult to identify. Particularly in the case of a camera which can indicate the time counting operation of its self-timer, since a certain interval passes after an indication of the completion of the time counting operation has been provided, a person to be photographed may believe that photography has already been completed, and change a pose.

SUMMARY OF THE INVENTION

It is, therefore, an object of the present invention to provide a red-eye preventing device for preventing a red-eye phenomenon by projecting red-eye preventing illumination light onto a subject prior to execution of flash photography. The device includes red-eye preventing illumination means for projecting the red-eye preventing illumination light, time counting means for counting a predetermined time required to attain a red-eye preventing effect by the red-eye preventing illumination means, inhibiting means for inhibiting a camera from proceeding to a photographic operation until the time counting means completes counting the predetermined time, and setting means for setting the predetermined time to be counted by the time counting means in accordance with the kind of photographic mode of the camera so as to shorten a release time lag. The device is capable of shortening the release time lag which occurs in projecting the red-eye preventing illumination light onto the subject, without lowering the red-eye preventing effect.

Another object of the present invention is to provide a red-eye preventing device for preventing a red-eye phenomenon by projecting red-eye preventing illumination light onto a subject prior to execution of flash photography. The device includes red-eye preventing illumination means for projecting the red-eye preventing illumination light, time counting means for counting a predetermined time required to attain a red-eye preventing effect by the red-eye preventing illumination means, inhibiting means for inhibiting a camera from proceeding to a photographic operation until the time counting means completes counting the predetermined time, and indicating means for indicating the predetermined time which is being counted by the time counting means, in a form according to the photographic mode of the camera. The device can appropriately indicate a release time lag which occurs in projecting the red-eye preventing illumination light onto the subject.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 3, 4(a), 4(b), 4(c) and 7 to 11(a), 11(b) are flowcharts showing different embodiments of the operation of the camera shown in FIG. 1.

DETAILED DESCRIPTION OF THE PREFERRED EMBODIMENT

Preferred embodiments of the present invention will be described below with reference to the accompanying drawings.

Figure 1:
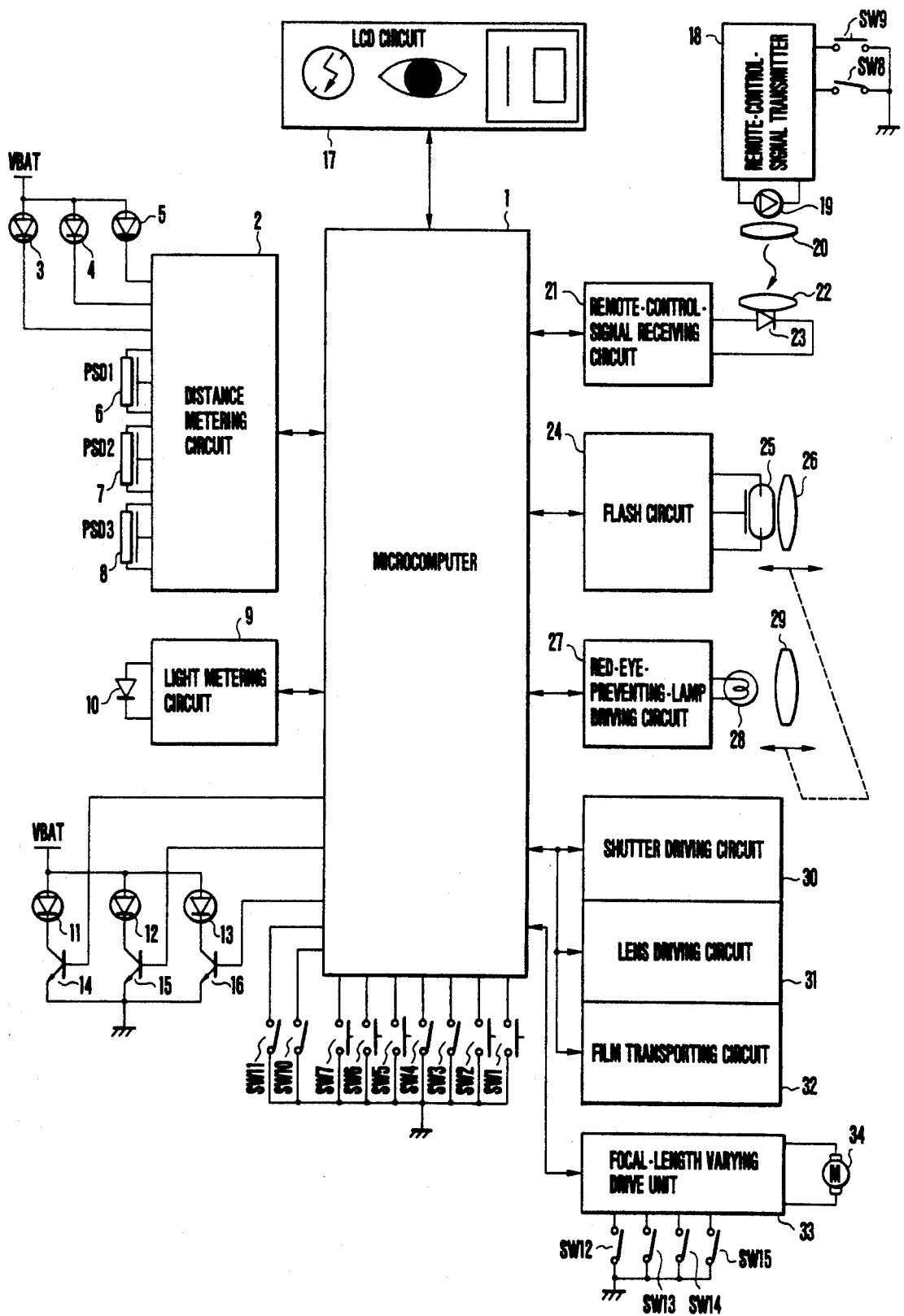
FIG. 1 is a schematic block diagram showing the arrangement of a camera to which embodiments of the present invention are applied.

FIG. 1 is a block diagram schematically showing the arrangement of a camera according to the present invention. The camera shown in FIG. 1 comprises a microcomputer (hereinafter referred to as a "CPU") 1 for controlling various kinds of operations of the camera, a known distance metering circuit 2 for providing metered-distance data by causing infrared rays emitting elements (hereinafter referred to as "IREDs") 3, 4 and 5 to project infrared rays onto a subject and causing position detecting sensors (hereinafter referred to as "PSDs") 6, 7 and 8 to detect light reflected from the subject, a known light metering circuit 9 for finding metered-light data by causing a light receiving element 10 to detect the luminance of the subject, and light emitting elements (hereinafter referred to as "LEDs") 11, 12 and 13 which are turned on and off by corresponding transistors 14, 15 and 16. The light emitting elements 11, 12 and 13 respectively serve as an LED for indicating a self-timer operation, an LED for indicating flash photography and a warning of low-luminance conditions, and an LED for indicating the readiness of AF-photography. A liquid-crystal display circuit 17 displays information about the camera, for example, film-counter information, information indicative of a red-eye preventing mode and information relative to flash photography. An element 18 is a remote-control-signal transmitter, and two different remote-control modes are prepared: a remote-controlled 2-second delayed release mode for executing a shutter release 2 seconds after the reception of a remote-control signal and a remote-controlled immediate release mode for executing a shutter release immediately after the reception of a remote-control signal. Either one of the two remote-control modes is selected by a switch SW8, and if a switch SW9 is turned on, a light signal serving as a remote-control signal is emitted from an IRED 19 and projected through a lens 20 in the form of converged light. The remote-control signal is focused by a lens 22, detected by a light receiving element 23, and subjected to signal processing in a remote-control-signal receiving circuit 21. The result is sent to the CPU 1, and a series of remote-controlled shutter release operations which will be described later is performed. A flash circuit 24 performs charging and flashing of a flash unit. Flash light emitted from a xenon tube 25 is converged at an illumination angle corresponding to the focal length of a photographic lens by a lens 26 which moves in accordance with the focal length of the photographic lens, and the flash light thus converged is projected onto the subject. A driving circuit 27 drives a red-eye preventing lamp 28. Light emitted from the red-eye preventing lamp 28 is converged at an illumination angle corresponding to the focal length of the photographic lens by a lens 29 which moves in accordance with the focal length of the photographic lens in a manner similar to that of the lens 26, and the light thus converged is projected onto the subject. A shutter driving circuit 30 executes an exposure operation, a lens driving circuit 31 executes driving for focus adjustment (in-focus driving) of the photographic lens on the basis of metered-distance data provided by the distance metering circuit 2, and a film transporting circuit 32 executes winding and rewinding of a film. A switch SW1 is a photographic preparation switch which is turned on, for example, by pressing a shutter release button halfway down, to cause the camera to execute distance metering, light metering and the like. A switch SW2 is a shutter release switch which is turned on, for example, by pressing the shutter release button all the way down, to cause the camera to execute an exposure operation. A switch SW3 is a distance-metering view selecting switch for executing selection between metered-distance data relative to the entire image field (an AF wide view), which is obtained by using the three IREDs 3, 4 and 5 of the distance metering circuit 2, and metered-distance data relative to the middle portion of the image field (an AF single view), which is obtained by using only the IRED 4. A switch SW4 is a remote-control switch for setting a remote-control mode and placing the camera in the state of waiting for a signal to be received from the remote-control-signal transmitter 18. A switch SW5 is a self-timer switch for activating a self-timer photographic operation. A switch SW6 is a flash-mode setting switch for selectively setting a flash mode from among, for example, an automatic mode in which flash photography is automatically set when a low-luminance condition is detected, a manual ON mode in which flash photography is set at any time, and a manual OFF mode in which flash photography is set at no time. A switch SW7 is a red-eye-preventing-mode setting switch for selecting either a mode in which when a predetermined condition is established, a red-eye preventing illumination lamp is lit up or a mode in which even when the predetermined condition is established, the red-eye preventing illumination lamp is not lit up.

A focal-length varying drive unit 33 varies the focal length of the photographic lens. When a switch SW10 is turned on, the CPU 1 sends to the focal-length varying drive unit 33 a signal to cause it to drive the photographic lens in the direction of a wide-angle side toward which the focal length becomes shorter. The focal-length varying drive unit 33 receives the signal and energizes a zooming motor 34 in the corresponding direction, thereby driving the photographic lens in the direction in which it is zoomed toward the wide-angle side. When a switch SW11 is turned on, the CPU 1 sends to the focal-length varying drive unit 33 a signal to cause it to drive the photographic lens in the direction of a telephoto-angle side toward which the focal length becomes longer. The focal-length varying drive unit 33 receives the signal and energizes a zooming motor 34 in the corresponding direction, thereby driving the photographic lens in the direction in which it is zoomed toward the telephoto side. The CPU 1 fetches focal-length information on the photographic lens by utilizing zoom-position detecting switches SW12, SW13, SW14 and SW15.

Figure 2:
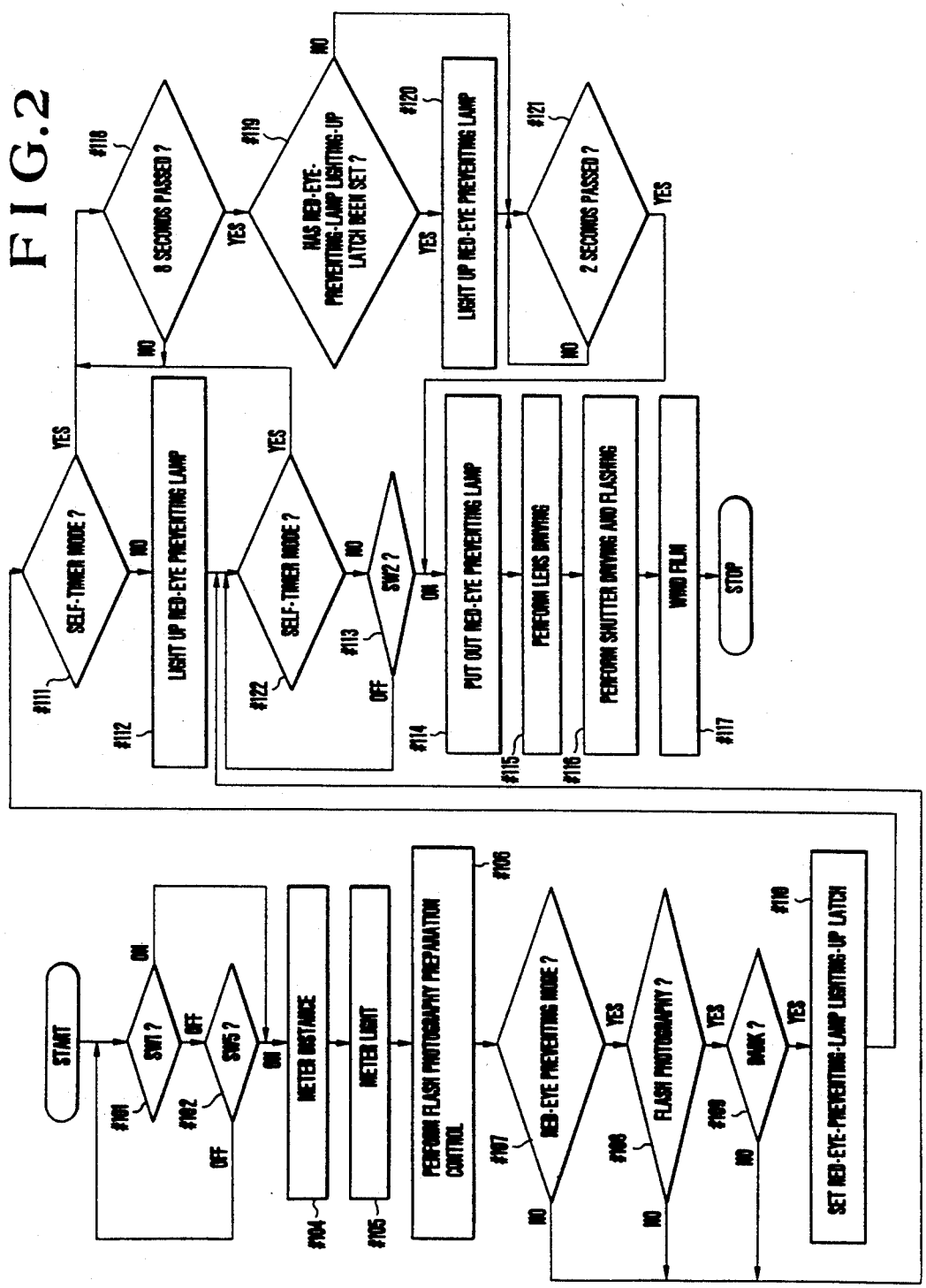
FIG. 2 is a flowchart showing the operation of the camera shown in FIG. 1.

The operation of the camera shown in FIG. 1 will be described below with reference to the flowchart of FIG. 2 which shows the operation of the CPU 1.

First of all, a normal photographic operation (the photographic operation which is performed when a self-timer mode or a remote-control mode is not set) will be described below. When the switch SW1 is turned on, for example, by pressing the shutter release button halfway down, the CPU 1 initiates a series of preparatory operations for photography (#101). More specifically, the CPU 1 sends a command to the distance metering circuit 2 and causes it to perform the distance metering operation of lighting up the IREDs 3, 4 and 5 at a predetermined frequency and obtaining metered-distance data corresponding to the respective IREDs 3, 4 and 5 from reflected light (#104). The CPU 1 also sends a command to the light metering circuit 9 and causes it to perform the light metering operation of obtaining a subject luminance through the light receiving element 10 (#105). Then, a series of flash photography preparation control operations is executed in accordance with the setting of the flash-mode setting switch SW6 (#106). More specifically, in a case where the flash mode is set to the automatic mode. If it is determined that luminance is low on the basis of the result of the light metering performed in Step #105, the CPU 1 sends a command to the flash circuit 24 to cause it to perform flash charging, thereby setting a flash photography latch. If the flash mode is set to the manual ON mode, flash charging and setting of the flash photography latch are unconditionally executed. If the flash mode is set to the manual OFF mode, the flash photography latch is cleared and no flash charging is performed. When the series of flash photography preparation control operations is completed, it is determined from the state of the switch SW7 whether the red-eye preventing mode has been selected (#107). If it is determined that the red-eye preventing mode has been selected, it is determined whether the flash photography latch explained in connection with Step #106 has been set (#108). If it is determined that the flash photography latch has been set, it is determined whether the value of the light metered in Step #105 is not greater than the predetermined value (#109). If it is determined that the value is not greater than a predetermined value, i.e., it is darker than a predetermined luminance, a red-eye-preventing-lamp lighting-up latch for lighting up the red-eye-preventing-lamp 28 for the purpose of photography is set (#110). Then, it is determined from the state of the self-timer switch SW5 whether a self-timer photography mode has been selected (#111). In this case, since not the self-timer photography but the normal photographic operation has been selected through the switch SW1 as described above, the red-eye-preventing-lamp driving circuit 27 lights up the red-eye preventing lamp 28 (#112), and the process waits for the switch SW2 to be turned on by pressing the shutter release button all the way down (#113). If the red-eye preventing mode has not been selected (#107), if no flash photography has been selected (#108) or if it is sufficiently bright (#109), the red-eye-preventing-lamp lighting-up latch is not set and the red-eye-preventing-lamp 28 is not lit up. Thereafter, if the switch SW2 is turned on (#113), the red-eye preventing lamp 28 is put out (#114) and the photographic lens is driven to its in-focus position by the lens driving circuit 31 on the basis of the metered-distance data supplied from the distance metering circuit 2 (#115). Then, the shutter driving circuit 30 is caused to open a shutter to execute an exposure operation, and if the flash photography latch is set at this time, the flash unit is flashed by the flash circuit 24 (#116). After the exposure operation has been completed, the film transporting circuit 32 executes film winding for one frame (#117).

An operation in which the red-eye preventing lamp 28 is lit up when the self-timer photography mode is in operation will be described below. When the switch SW5 is turned on to activate a self-timer, the self-timer photography mode is set (#102). Thereafter, the distance metering operation (#104), the light metering operation (#105), and the flash photography preparation control (#106) are executed in a manner similar to above-described. If it is determined that the red-eye preventing mode has been selected (#107), if it is determined that flash photography has been selected (#108) and if it is determined that it is darker than the predetermined luminance (#109), the red-eye-preventing-lamp lighting up latch is set. At this time, however, since the self-timer photography mode is in operation, the red-eye preventing lamp 28 is not lit up (#111) and a timer incorporated in the CPU 1 counts the first 8 seconds in a self-timer time of 10 seconds (#118). After the self-timer time of 8 seconds has passed, the state of the red-eye-preventing-lamp lighting-up latch is checked. Since the red-eye-preventing-lamp lighting-up latch has been set (#119), the red-eye preventing lamp 28 is lit up by the red-eye-preventing-lamp driving circuit 27 (#120). Then, after the aforesaid timer has counted the remaining 2 seconds (#121), the red-eye preventing lamp 28 is put out (#114) and a series of photographic operations including a photographic-lens driving step (#115), a shutter driving step and a flashing step (#116), and a film winding step (#117) are executed in a manner similar to that described above. If it is determined that the red-eye preventing mode has not been selected (#107), if it is determined that the flash photography mode has not been selected (#108) or if it is determined that it is sufficiently bright (#109), the red-eye-preventing-lamp lighting-up latch is not set. Since the self-timer photography mode is in operation (#122), after a self-timer time of 8 seconds has passed (#118), the state of the red-eye-preventing-lamp lighting-up latch is checked (#119). Since the red-eye-preventing-lamp lighting-up latch has not been set (#119), the red-eye preventing lamp 28 is not lit up. After 2 seconds have passed (#121), the series of photographic operations explained above in connection with Steps #114 to #177 is executed.

Figure 3:
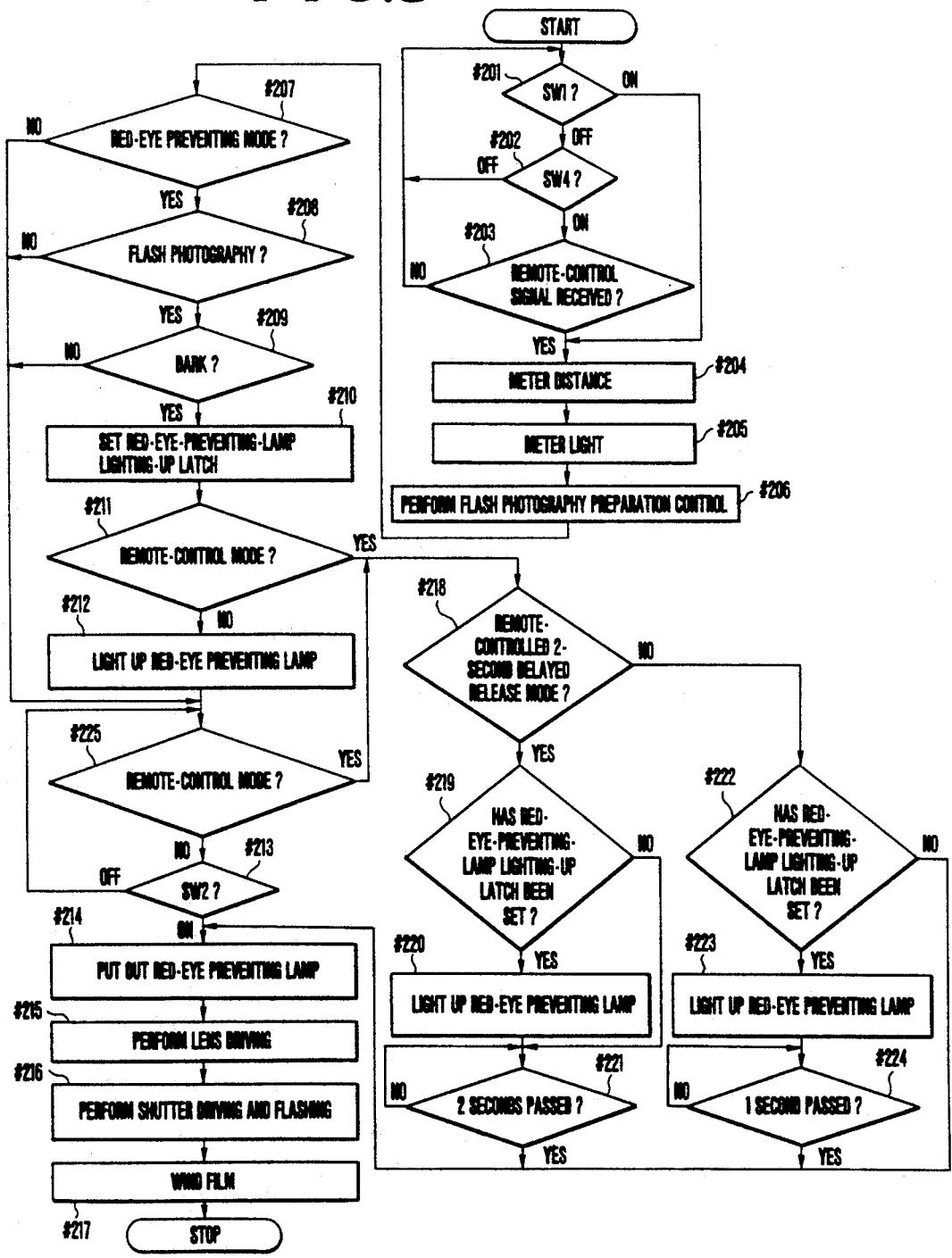

Another embodiment of the operation of the camera of FIG. 1 will be described below with reference to the flowchart of FIG. 3 which shows the operation of the CPU 1. In FIG. 3, Steps #204 to #210 and Steps #212 to #217 are respectively identical with Steps #104 to #110 and Steps #112 to #117 of FIG. 2. The normal photographic operation utilizing the switch SW1 is substantially identical with that explained in connection with FIG. 2, and explanation is omitted.

When the switch SW4 is turned on, the remote-control mode is set (#202). In this state, if a photographer turns on the remote-control-signal transmitting switch SW9 of the remote-control-signal transmitter 18, a remote-control signal from the IRED 19 is received by the remote-control signal receiving sensor 23 through the lenses 20 and 2, and the received signal is subjected to signal processing in the remote-control-signal receiving circuit 1. Thus, the reception of the remote-control signal is completed (#203). Thereafter, a distance metering operation (#204), a light metering operation (#205) and flash photography preparation control (#206) are executed in a manner similar to that described previously. If it is determined that the red-eye preventing mode has been selected (#207), if it is determined that flash photography has been selected (#208) and if it is determined that it is darker than a predetermined luminance (#209), the red-eye-preventing-lamp lighting-up latch is set. Then, it is determined whether the remote-control mode has been selected (#211).

Since the remote-control mode is in operation, it is determined whether the received remote-control signal is a signal of the aforesaid remote-controlled 2-second delayed release mode selected by the switch SW8 or a signal of the aforesaid remote-controlled immediate release mode (#218). In the case of the signal of the remote-controlled 2-second delayed release mode, the state of the red-eye-preventing-lamp lighting-up latch is checked (#219). Since the red-eye-preventing-lamp lighting-up latch has been set as described previously, the red-eye-preventing-lamp driving circuit 27 is caused to light up the red-eye preventing lamp 28 (#220). After the timer incorporated in the CPU 1 has counted 2 seconds (#221), a series of photographic operations similar to the aforesaid operations is executed which includes the step of putting out the red-eye preventing lamp 28 (#214), a photographic-lens driving step (#215), a shutter driving step and a flashing step (#216), and a film winding step (#217). If it is determined that the red-eye preventing mode has not been selected (#207), if it is determined that the flash photography has not been selected (#208) or if it is determined that it is sufficiently bright (#209), the process proceeds to Step 225, where it is determined whether the remote-control mode has been selected. If it is determined that the remote-control mode has been selected, the process proceeds to Step 218, where it is determined whether the remote-controlled 2-second delayed release mode has been selected. If the remote-controlled 2-second delayed release mode has been selected, the red-eye-preventing-lamp lighting-up latch is not set and the red-eye preventing lamp 28 is not lit up (#219). After 2 seconds have passed (#221), the aforesaid series of photographic operations is executed (#214 to 217).

If it is determined in Step #218 that the remote controlled immediate release mode has been selected and if it is determined that the red-eye-preventing-lamp lighting-up latch has been set (#222), the red-eye preventing lamp 28 is lit up for 1 second which is the minimum time required to close the pupils of the eyes, counted by the timer incorporated in the CPU 1 (#223, #224). Thereafter, the aforesaid series of photographic operations is executed which includes the step of putting out the red-eye preventing lamp 28 (#214), the photographic lens driving step (#215), the shutter driving step and the flashing step (#216), and the film winding step (#217). If it is determined that the red-eye preventing mode has not been selected (#207), if it is determined that the flash photography has not been selected (#208) or if it is determined that it is sufficiently bright (#209), the process proceeds to Step #225, where it is determined whether the remote-control mode has been selected. If it is determined that the remote-control mode has been selected, the process proceeds to Step #218. If the remote-controlled immediate release mode has been selected (#218), the red-eye-preventing-lamp lighting-up latch has not been set and the red-eye preventing lamp 28 is not lit up (#222). The release time lag of 1 second is not inserted and the aforesaid series of photographic operations is executed (#214 to #217).

Yet another embodiment of the operation of the camera of FIG. 1 will be described below with reference to the flowcharts of FIGS. 4(a), 4(b) and 4(c) which show the operation of the CPU 1.

First of all, the normal photographic operation (the photographic operation which is performed when the self-timer mode or the remote-control mode is not set) will be described below. When the switch SW1 is turned on, for example, by pressing the shutter release button halfway down, the CPU 1 initiates a series of preparatory operations for photography in Step #301. More specifically, in Step #305, the CPU 1 sends a command to the distance metering circuit 2 and causes it to perform the distance metering operation of lighting up the IREDs 3, 4 and 5 at a predetermined frequency and obtaining metered-distance data corresponding to the respective IREDs 3, 4 and 5 from reflected light. In Step #306, the CPU 1 also sends a command to the light metering circuit 9 and causes it to perform the light metering operation of obtaining a subject luminance through the light receiving element 10. Then, in Step #307, in a case where the flash mode is set to the automatic mode in accordance with the setting of the flash-mode setting switch SW6, if it is determined that luminance is low on the basis of the result of the light metering performed in Step #306, the CPU 1 sends a command to the flash circuit 24 to cause it to perform flash charging, and sets the flash photography latch. If the flash mode is set to the manual ON mode, flash charging and setting of the flash photography latch are unconditionally executed. If the flash mode is set to the manual OFF mode, the flash photography latch is cleared and no flash charging is performed.

When the aforesaid series of photographic preparatory operations is completed, the CPU 1 supplies, in Step #308, a base current to the transistor 16 to light up the AF-photography readiness LED 13 (hereinafter referred to as a "photography readiness indication"). Thereafter, if it is determined in Step #309 from the state of the switch SW7 that the red-eye preventing mode has been set, if it is determined in Step #310 that the flash photography latch has been set, and if it is determined in Step #311 that the metered-light data from the light metering circuit 9, i.e., the subject luminance metered at this time, is not greater than the predetermined luminance, it is necessary to light up the red-eye preventing lamp 28. Accordingly, the red-eye-preventing-lamp lighting-up latch is set in Step #312. Then, the process proceeds to Step #315 through Steps #313 and #314. In Step #315, the CPU 1 actually sends a command to the red-eye-preventing-lamp driving circuit 27 to light up the red eye preventing lamp 28. In the next step #316, a red-eye preventing timer is started to count the time required to close the pupils of the eyes to a sufficient extent by the flashing of the red-eye preventing lamp 28. Since a release lock is, as explained later, active until the pupils are closed to the sufficient extent, the photography readiness indication is put out in Step #317, and the process proceeds to Step #318.

If it is determined in Step #309 that the red-eye preventing mode has not been set, if it is determined in Step #310 that the flash photography latch has not been set, or if it is determined in Step #311 that the subject luminance is greater than the predetermined luminance, the operations of Steps #312 to #317 are not performed and the process immediately proceeds to Step #318. Accordingly, in this case, the photography readiness indication remains lit.

If the switch SW1 remains on with the shutter release button pressed halfway down, the process proceeds from Step #318 to Step #319, where it is determined whether the predetermined time required to close the pupils to the sufficient extent has passed. If it is determined that the predetermined time has not passed, the process proceeds to Step #323 through Steps #321 and #322. In Step #323, if the shutter release button has not been pressed all the way down to turn on the switch SW2, the process returns to Step #318 and similar operations are repeated. Thereafter, when the aforesaid predetermined time has passed, the process proceeds from Step #319 to Step #320, where the photography readiness indication is again lit up to indicate that photography may be initiated since the pupils have been closed to the sufficient extent, i.e., the release lock has been cancelled.

If it is determined in Step #318 that the switch SW1 has been turned off, the red-eye preventing lamp 28 is put out in Step #331 and the photography readiness indication is put out in Step #332, and the process returns to Step #301.

After the aforesaid predetermined time has passed, if the photographer presses the shutter release button all the way down to turn on the switch SW2, the process proceeds from Step #323 to Step #324, where the photography readiness indication is put out. In the next step #325, it is determined whether the red-eye-preventing-lamp lighting-up latch has been set. If it is determined that the red-eye-preventing-lamp lighting-up latch has not been set, the process proceeds to Step #328. If the red-eye-preventing-lamp lighting-up latch has been set, the process proceeds to Step #326, where it is determined whether a predetermined time has passed. The reason why it is determined here whether the predetermined time has passed is to prevent photography from being performed with the pupils closed to an insufficient extent if the switches SW1 and SW2 are continuously turned on by the quick depression of the shutter release button as will be described later. In such a case, a release lock operation is performed until the predetermined time passes (as will be described later in detail). Since it has been determined in Step #319 that the predetermined time has already passed, the process immediately proceeds to Step #327. After the red-eye preventing lamp 28 has been put out in Step #327, the process proceeds to Step #328.

When the above-described operations have been completed, the process proceeds to a substantial photographic operation. In Step #328, the photographic lens is driven to an in-focus position by the lens driving circuit 31. In Step #329, the shutter driving circuit 30 and the flash circuit 24 are activated to control shutter opening and closing operations and to control a flashing operation, respectively. In Step #330, film winding for one frame is performed by the film transporting circuit 32, thereby completing the series of photographic operations.

Figure 5:
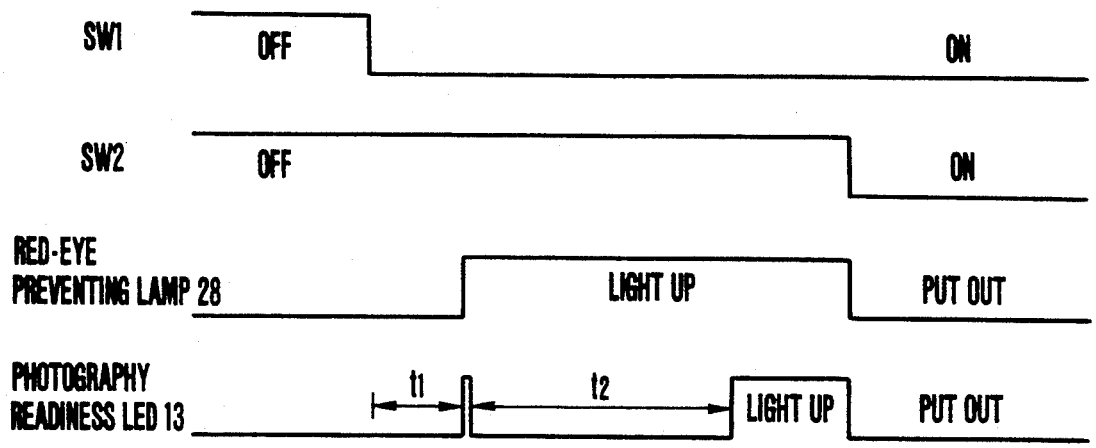
FIGS. 5 and 6 are timing charts of the operation shown in FIGS. 4(a), 4(b) and 4(c).

FIG. 5 is a timing chart showing the timings of essential parts during the above-described operations. In FIG. 5, $t_1$ indicates the time required to complete the operations of Steps #305 to #307, and $t_2$ indicates a predetermined time which passes from the time the red-eye preventing lamp 28 is lit up until the pupils close to a sufficient extent.

The following explanation is made in connection with the normal photographic operation performed when the switches SW1 and SW2 are continuously turned on by the quick depression of the shutter release button. In the explanation, it is assumed that the red-eye-preventing-lamp lighting-up latch has been set.

In such a case, the process does not wait for passage of the predetermined time in Step #319, and proceeds along Steps #319→#321→#322→#323→#324→#325→#326. In Step #326, it is determined whether the predetermined time has passed, and if the predetermined time passes, the process proceeds to operations subsequent to Step #326, that is, a shutter release operation is refused until it is determined in Step #326 that the predetermined time has passed. In other words, to cope with the quick depression of the shutter release button, a release lock time is inserted here.

Figure 6:
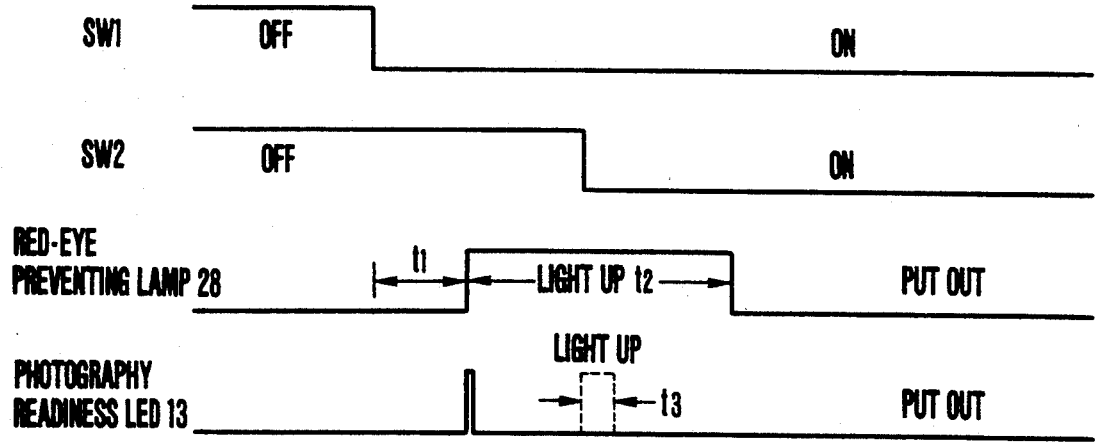

FIG. 6 is a timing chart showing the timings of the essential parts when the shutter release button is quickly depressed as described above. As can be seen from FIG. 6, the lighting-up time of the red-eye preventing lamp 28 corresponds to the predetermined time $t_2$ (immediately after the time $t_1$) which follows the completion of the photography readiness operation. Immediately thereafter, a photographic operation is executed.

The following explanation is made in connection with a case where the self-timer photography mode has been set.

In this case, since the switch SW5 is on, even if it is determined in Step #301 that the switch SW1 is off, the process proceeds from Step #302 to Step #305. Thereafter, the process proceeds along Steps #306→#307→#308→#309→#310→#311→#312→#313. (In this explanation, it is assumed that the answer is "YES" in each of Steps #309, #310 and #311.) Since it is determined in Step #313 that the self-timer photography mode has been set, the process proceeds from Step #313 to Step #333. In Step #333, the photography readiness indication is again lit up (remains lit) unlike the normal photographic operation in which the photography readiness indication is put out. The process proceeds through Step #334 to Step #335, where the counting of the first 8 seconds in a self-timer time of 10 seconds is performed. After the 8 seconds have passed, the process proceeds to Step #336, where the state of the red-eye-preventing-lamp lighting-up latch is checked. Since the red-eye-preventing-lamp lighting-up latch has been set, the process proceeds to Step #337, where the red-eye preventing lamp 28 is lit up. Then, the process proceeds to Step #338, where it awaits the passage of the remaining 2 seconds in Step #338. Then, the process proceeds to Step #339, where the time-up of the predetermined elapsed time of the lighting-up of the red-eye preventing lamp 28 is set. (The state of the time-up of the predetermined elapsed time is referenced when it is determined in Step #326 whether the predetermined time has passed.) The process proceeds to Step #324, and subsequently, operations similar to the above-described operations are performed.

If it is determined that the red-eye preventing mode has not been selected (#309), if it is determined that the flash photography latch has not been set (#310) or if it is determined that it is brighter than a predetermined luminance (#311), the process proceeds to Step #318, where it enters a routine for waiting for the switch SW2 to be turned on. Here, since the self-timer mode has been set, the process proceeds from Step #321 to Step #333 and subsequently, operations similar to the above-described operations are performed.

The feature of the self-timer photography mode is as follows. In general, approximately 1 second suffices for the predetermined time during which the red-eye preventing lamp 28 is kept lit. Therefore, during the self-timer photography mode in which a time interval exceeding such predetermined time (for example, 10 seconds) is set, a predetermined time (2 seconds) during which the red-eye preventing lamp 28 is lit up can be inserted immediately before the completion of the time interval (in order to prevent the problem that after the self-timer time has passed, the red-eye preventing lamp 28 is lit up to introduce an excessive release time lag). Accordingly, the photography readiness indication is kept lit so that the photographer can get into a pose during the next self-timer operation without anxiety.

The following explanation is made in connection with a case where the remote-control mode has been set. As described previously, the two different remote-control modes are prepared: one is the remote-controlled 2-second delayed release mode (a mode for initiating a shutter release 2 seconds after the reception of a remote-control signal) and the other is the remote-controlled immediate release mode (a mode for initiating a shutter release immediately after the reception of a remote-control signal (in the present embodiment, immediately after the passage of 1 second). Either one of the two remote-control modes is selected by the switch SW8 of the remote-control-signal transmitter 18.

If the remote-control switch SW4 is turned on, the process proceeds to Step #303, where a selected remote-control mode is set. In this state, if the photographer turns on the remote-control-signal transmitting switch SW9 of the remote-control-signal transmitter 18, a remote-control signal is emitted from the transmitter 18 and inputted to the CPU 1 through the converging lens 22, the light receiving element 23 and the remote-control-signal receiving circuit 21. Thus, in Step #304, the CPU 1 determines that the remote-control signal has been received, and causes the process to proceed to Step #305. It is assumed here that the remote-controlled 2-second delayed release mode has been selected as the remote-control mode selected by the switch SW8. Subsequently, the process proceeds, as described above, along Steps #306→#307→#308→#309→#310→#311→#312→#313→#314. (In this explanation, it is assumed that the answer is "YES" in each of Steps #309, #310 and #311.) Since it is determined in Step #314 that the remote-control mode has been set, the process proceeds from Step #314 to Step #333. In Step #333, the photography readiness indication is again lit up (remains lit) as in the case of the aforesaid self-timer photography mode. The process then proceeds through Step #334 to Step #340, where the state of the red-eye-preventing-lamp lighting-up latch is checked. Since the red-eye-preventing-lamp lighting-up latch has been set, the process proceeds to Step #341, where the red-eye preventing lamp 28 is lit up. Then, the process proceeds to Step #342, where the kind of the remote-control mode is identified. Since the remote-controlled 2-second delayed release mode has been selected, the process proceeds from Step #342 to Step #338, where it awaits the passage of 2 seconds. Then, the process proceeds to Step #339, where the time-up of the predetermined elapsed time of the lighting-up of the red-eye preventing lamp 28 is set. Subsequently, operations similar to the above-described operations are performed.

If it is determined that the red-eye preventing mode has not been selected (#309), if it is determined that the flash photography latch has not been set (#310) or if it is determined that it is brighter than the predetermined luminance (#311), the process proceeds to Step #318, where it enters the routine for waiting for the switch SW2 to be turned on. Here, since the remote-control mode has been set, the process proceeds from Step #322 to Step #333 and subsequently operations similar to the above-described operations are performed.

If the remote-controlled immediate release mode has been selected by the switch SW8, the process proceeds from Step #342 to Step #343, where it awaits the passage of 1 second (to allow for the time required to prevent a red-eye phenomenon). Then, the process proceeds to Step #339, and subsequently, operations similar to the above-described operations are performed.

The feature of the remote-control mode is as follows. As in the case of the aforesaid self-timer photography mode, the predetermined time during which the red-eye preventing lamp 28 is kept lit can be inserted in a period until a shutter release is started by remote control. Accordingly, the photography readiness indication is kept lit so that the photographer can get into a pose (e.g., hide the remote-control-signal transmitter 18) without anxiety before remote-controlled photography is started.

Figure 7:
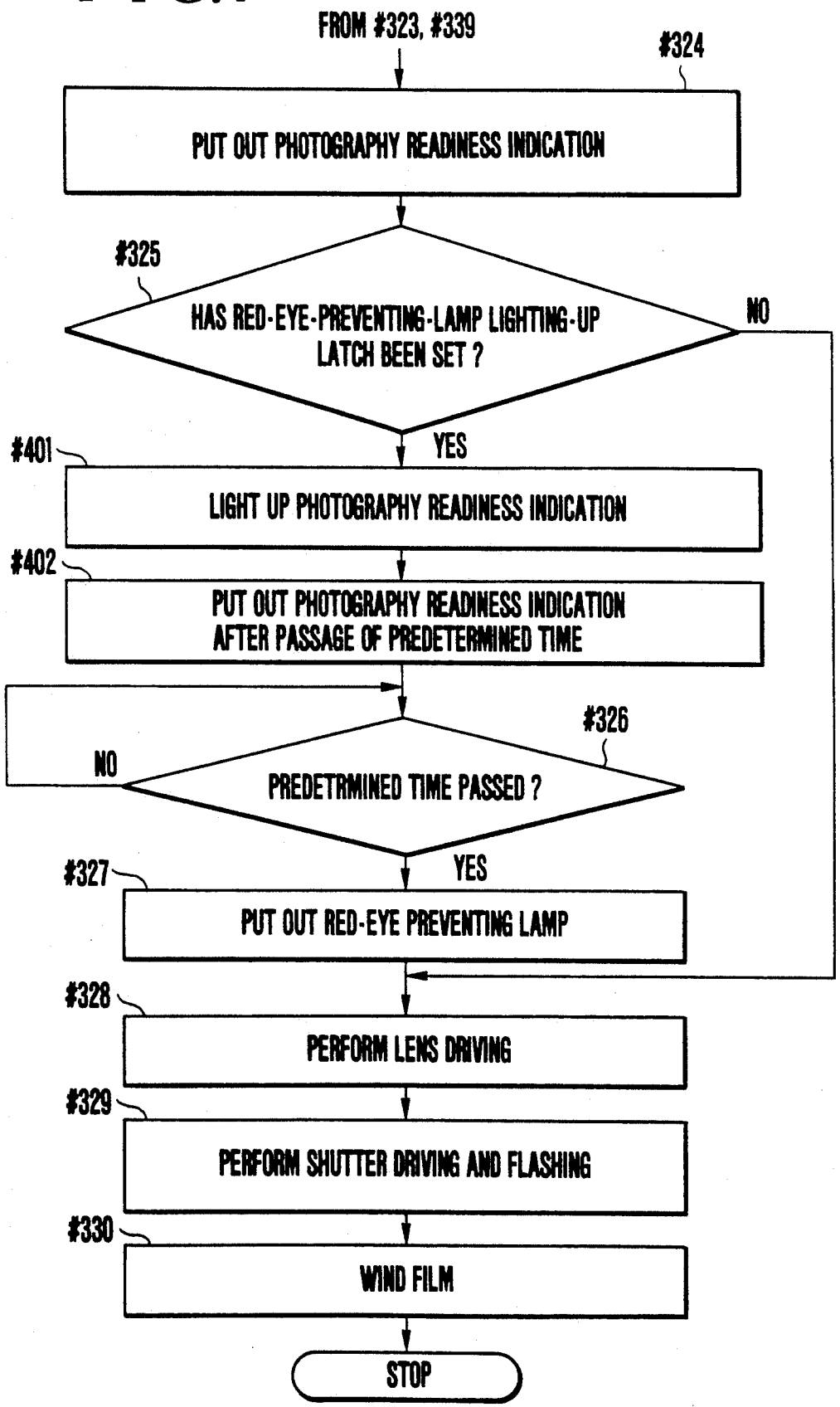

Yet another embodiment of the operation of the camera of FIG. 1 will be described below with reference to the flowchart of FIG. 9 which shows the operation of the CPU 1. In FIG. 7, there is shown only a flowchart segment different from those of the flowcharts shown in FIGS. 4(a), 4(b) and 4(c).

Figure 4A:
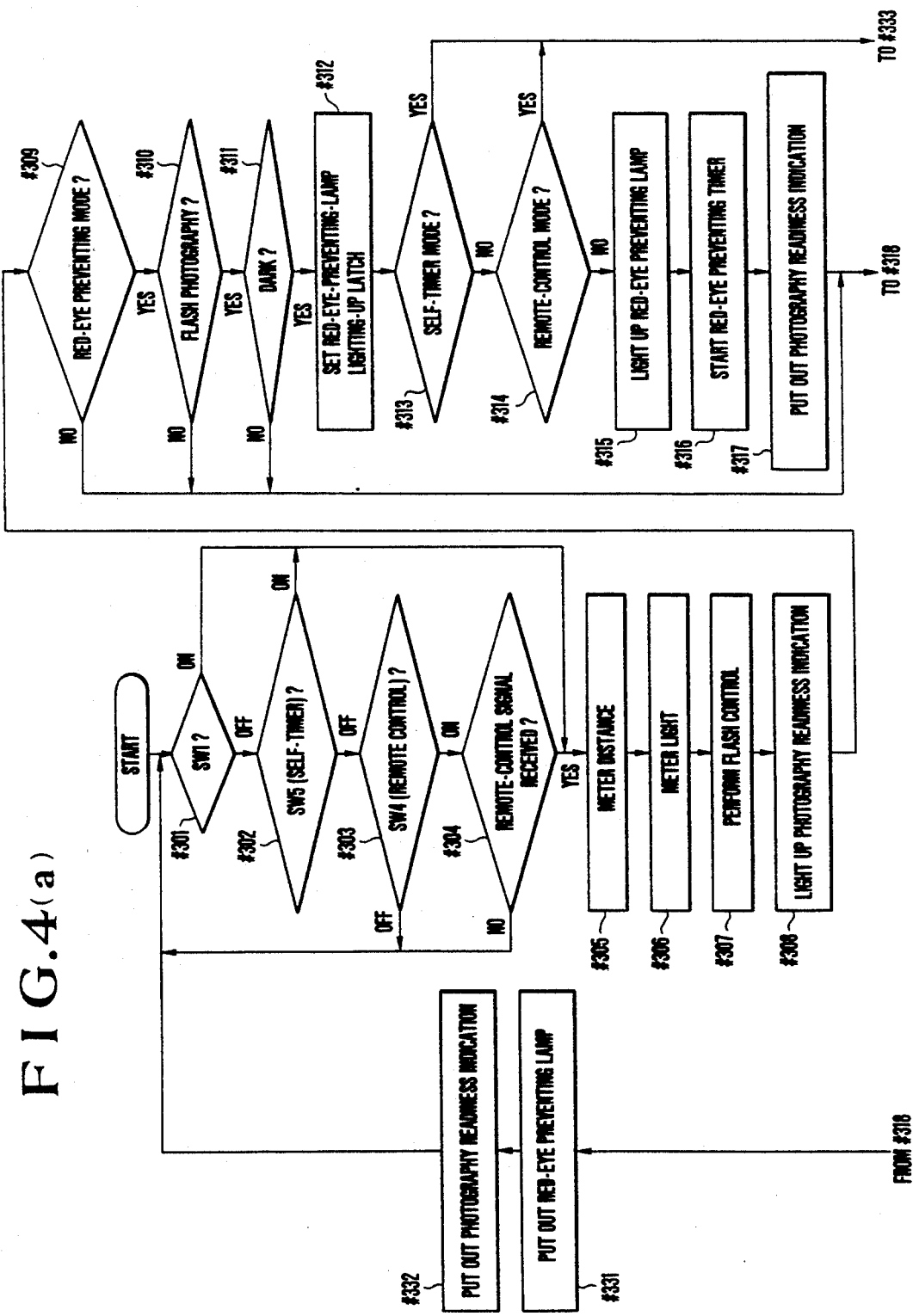
Figure 4B:
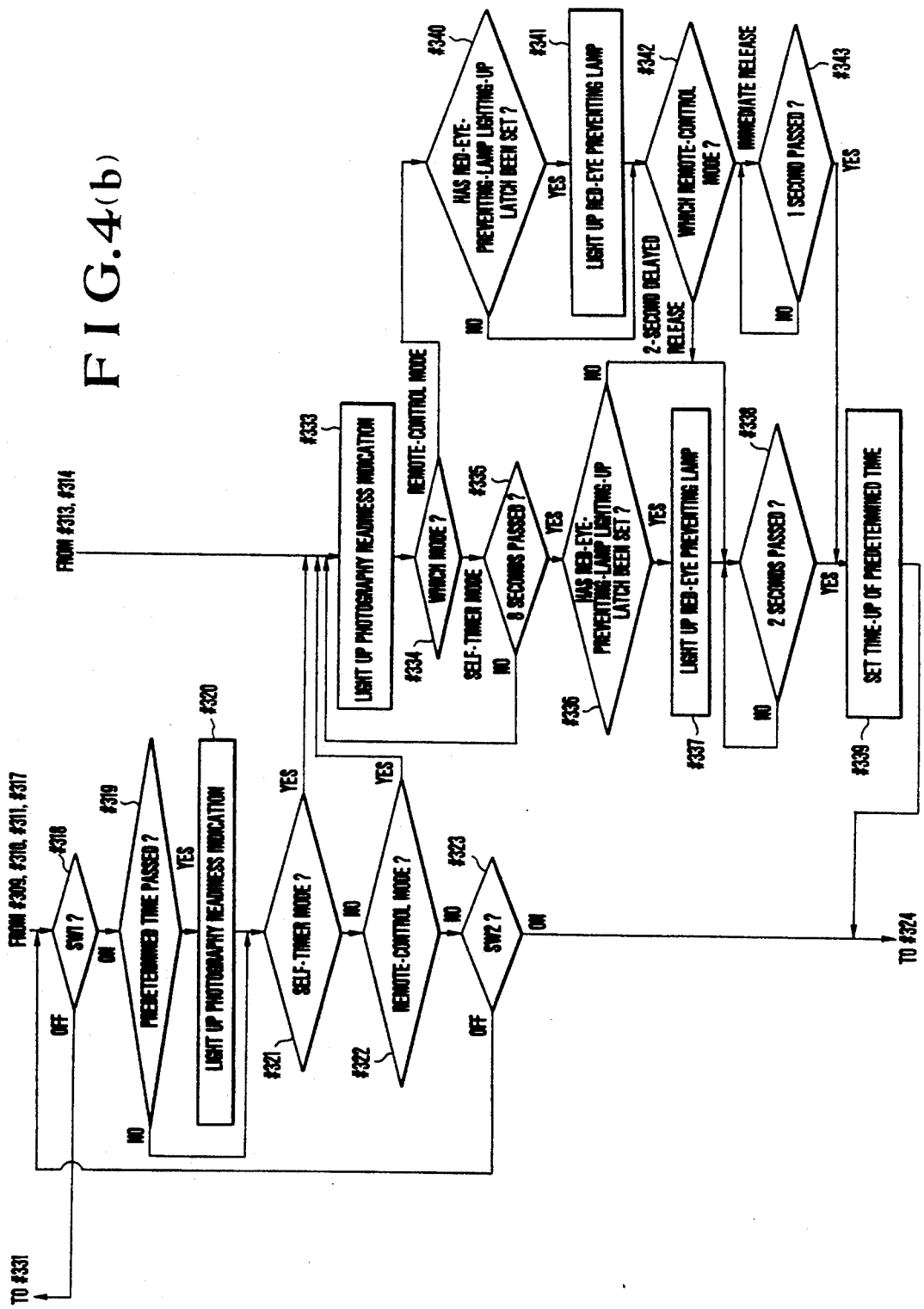
Figure 4C:
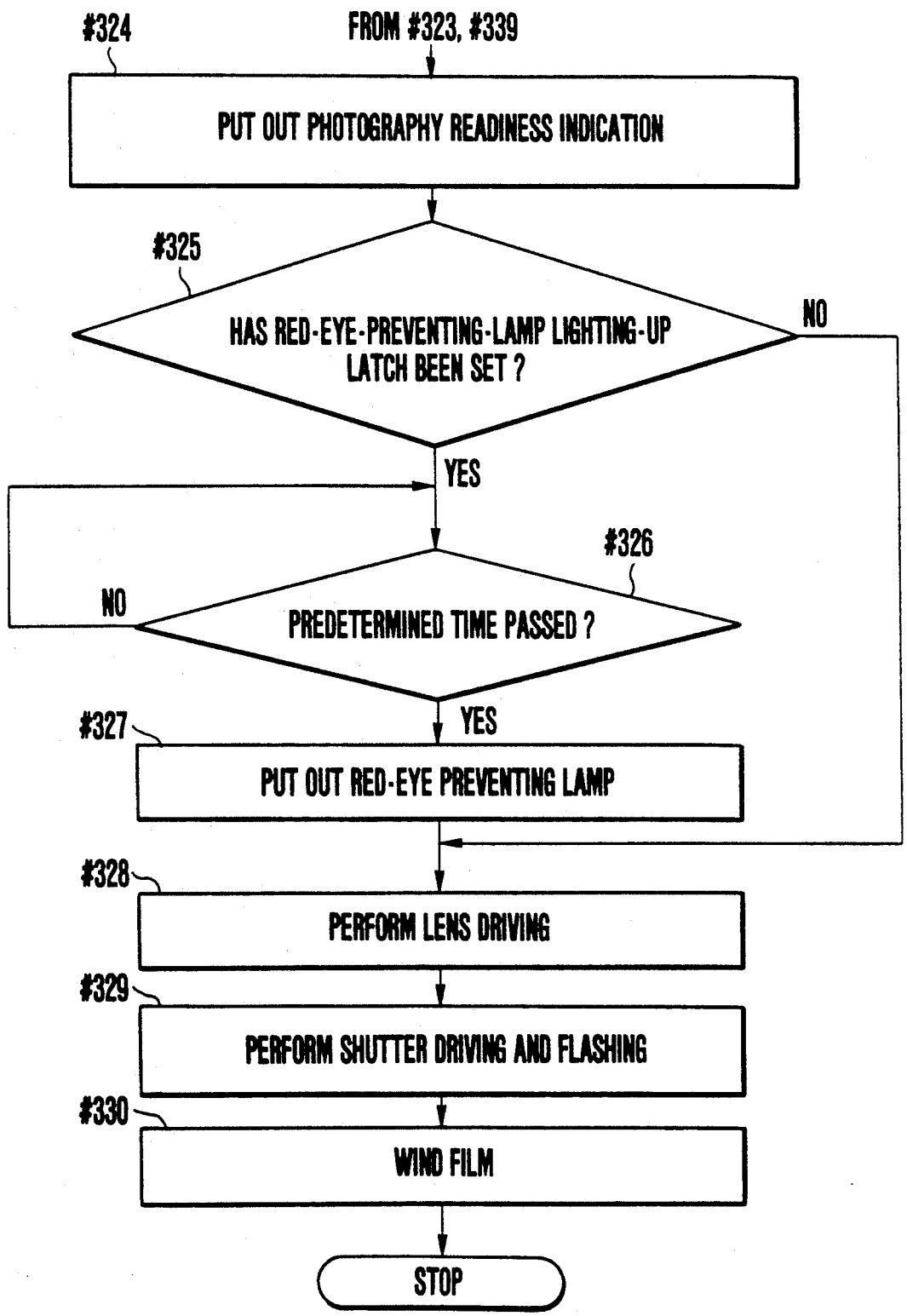

In the embodiment of FIGS. 4(a), 4(b) and 4(c), in a case where the answer is "YES" in each of Steps #309, #310 and #311, if the quick depression of the shutter release button is performed, the photography readiness indication remains off in Step #317 and it is impossible to determine when an ON signal from the switch SW2 was received. The embodiment of FIG. 7 implements an arrangement which can indicate when the ON signal from the switch SW2 was received.

More specifically, after it is determined in Step #325 where the red-eye-preventing-lamp lighting-up latch has been set, a photography readiness indication is provided in Step #401 so as to indicate that the switch SW2 has been turned on. In the next step #402, when a predetermined time t ($<t_2$) has passed, the photography readiness indication is put out and the above-described operations following Step #362 are performed. The state of the photography readiness indication performed at this time is shown by dashed lines in FIG. 6.

Yet another embodiment of the operation of the camera of FIG. 1 will be described below with reference to the flowcharts of FIGS. 8(a) and 8(b) which show the operation of the CPU 1.

When the switch SW1 is turned on, for example, by pressing the shutter release button halfway down, the CPU 1 initiates a series of preparatory operations for photography in Step #501. More specifically, in Step #502, the CPU 1 sends a command to the distance metering circuit 2 and causes it to perform the distance metering operation of lighting up the IREDs 3, 4 and 5 at a predetermined frequency and obtaining metered-distance data corresponding to the respective IREDs 3, 4 and 5 from reflected light. In Step #503, the CPU 1 also sends a command to the light metering circuit 9 and causes it to perform the light metering operation of obtaining a subject luminance through the light receiving element 10. Then, in Step #504, in a case where the flash mode is set to the automatic mode in accordance with the setting of the flash-mode setting switch SW6, if it is determined that luminance is low on the basis of the result of the light metering performed in Step #503, the CPU 1 sends a command to the flash circuit 24 to cause it to perform flash charging, and sets the flash photography latch. If the flash mode is set to the manual ON mode, flash charging and setting of the flash photography latch are unconditionally set. If the flash mode is set to the manual OFF mode, the flash photography latch is cleared and no flash charging is performed.

When the aforesaid series of photographic preparatory operations is completed, the CPU 1 supplies, in Step #505, a base current to the transistor 16 to light up the AF-photography readiness LED 13 (hereinafter referred to as the "photography readiness indication"). Thereafter, if it is determined in Step #506 that the red-eye preventing mode has been set by the switch SW7, if it is determined in Step #507 that the flash photography latch has been set, and if it is determined in Step #508 that the metered-light data from the light metering circuit 9, i.e., the subject luminance metered at this time, is less than the predetermined luminance, it is necessary to light up the red-eye preventing lamp 28 for later photography. Accordingly, the red-eye-preventing-lamp lighting-up latch is set in Step #509. Then, in Step #510, the CPU 1 actually sends a command to the red-eye-preventing-lamp driving circuit 27 to light up the red-eye preventing lamp 28. In the next step #511, the red-eye preventing timer is started to count the time required to close the pupils of the eyes to a sufficient extent by the flashing of the red-eye preventing lamp 28. Since a release lock is, as explained later, active until the pupils are closed to the sufficient extent, the photography readiness indication is, in Step 512, put out so as to indicate that photography is not yet been possible, and the process proceeds to Step #513.

If it is determined in Step #506 that the red-eye preventing mode has not been set, if it is determined in Step #507 that the flash photography latch has not been set, or if it is determined in Step #508 that the subject luminance is greater than the predetermined luminance, the operations of Steps #509 to #512 are not performed and the process immediately proceeds to Step #513. Accordingly, in this case, the photography readiness indication remains lit.

If the switch SW1 remains on with the shutter release button pressed halfway down, the process proceeds from Step #513 to Step #516, where it is determined whether the metered-distance data obtained in Step #502 is data indicative of a close-distance warning which means that a subject is located at such a close distance that it will be out of focus when photographed. If it is determined that the metered-distance data is the data indicative of such a close-distance warning, the process proceeds to Step #517, where the photography readiness indication is made to blink at 4Hz. Then, the process proceeds to Step #520. More specifically, if the subject is located at a close distance at which photography is impossible, the photography readiness indication is immediately made to blink at 4Hz with no wait of a predetermined time even when the red-eye preventing lamp 28 remains lit. If it is determined in Step #516 that the subject is located at a distance at which photography is possible, the process proceeds to Step #518, where it is determined whether the predetermined time required to close the pupils to the sufficient extent has passed. If it is determined that the predetermined time has not passed, the process proceeds to Step #520. In Step #520, if the shutter release button has not been pressed all the way down to turn on the switch SW2, the process returns to Step #513 and similar operations are repeated. Thereafter, when the aforesaid predetermined time has passed, the process proceeds from Step #518 to Step #519, where the photography readiness indication is again lit up to indicate that photography may be initiated since the pupils have been closed to the sufficient extent, i.e., the release lock has been cancelled.

If it is determined in Step #513 that the switch SW1 has been turned off, the red-eye preventing lamp 28 is put out in Step #514 and the photography readiness indication is put out in Step #515, and the process returns to Step #501.

Then, if the photographer presses the shutter release button all the way down to turn on the switch SW2 with the switch SW1 remaining on, the process proceeds from Step #520 to Step #521, where the photography readiness indication is put out. In the next step #522, it is determined whether the close-distance warning has been provided. If it is determined that the close-distance warning has been provided, the process immediately proceeds to Step #526 even during a release lock time in which the red-eye preventing lamp 28 is kept lit. In Step #526, the red-eye preventing lamp 28 is put out, and the process proceeds to a substantial photographic operation. In Step #528, the photographic lens is driven to an in-focus position by the lens driving circuit 31. In Step #529, the shutter driving circuit 30 and the flash circuit 24 are activated to control shutter opening and closing operations and to control a flashing operation, respectively. In Step #530, film winding for one frame is performed by the film transporting circuit 32, thereby completing the series of photographic operations.

If no close-distance warning has been provided, the process proceeds from Step #522 to Step #523, where the state of the red-eye-preventing-lamp lighting-up latch is checked. If the red-eye-preventing-lamp lighting up latch has not been set, the process proceeds to Step #526, where operations similar to the above-described operations are performed. If the red-eye-preventing-lamp lighting-up latch has been set, the process proceeds to Step #525, where it awaits the passage of a predetermined time. In other words, in a case where red-eye preventing illumination is needed, even if the switches SW1 and SW2 are continuously turned on by the quick depression of the shutter release button, a release time lag will occur during a certain predetermined interval excluding the time of the close-distance warning. Subsequently, as described above, in Step #526, the red-eye preventing lamp 28 is put out and in Step #528 the photographic lens is driven to an in-focus position by the lens driving circuit 31. In Step #529, the shutter driving circuit 30 and the flash circuit 24 are activated to control shutter opening and closing operations and to control a flashing operation, respectively. In Step #530, film winding for one frame is performed by the film transporting circuit 32, thereby completing the series of photographic operations.

Figure 8B:
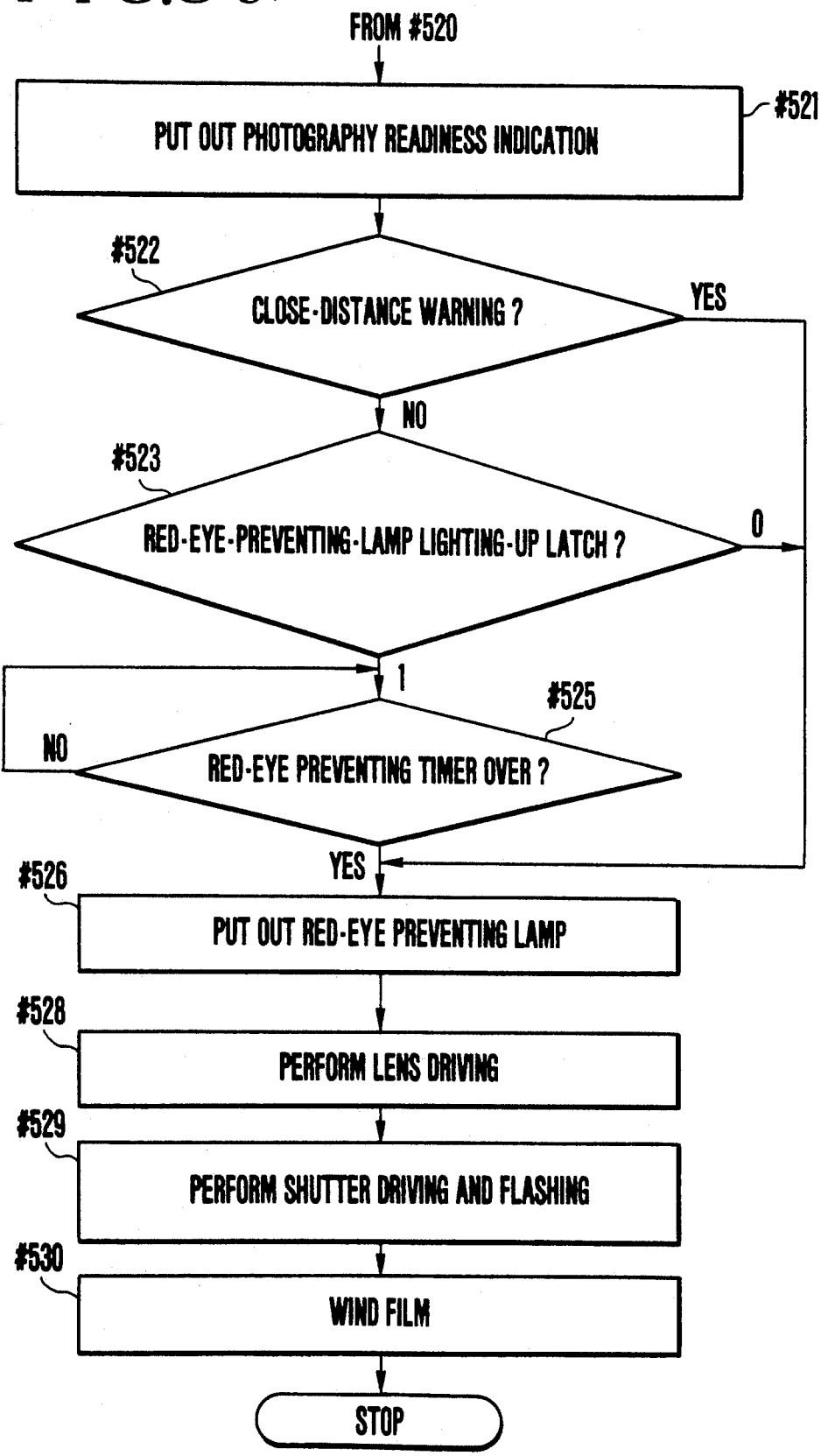

In the embodiment shown in FIGS. 8(a) and 8(b), if metered-distance information indicative of a close distance outside of the photographic range of the camera is obtained, the photography readiness indication is immediately made to blink at 4Hz. In a case where the above-described embodiment is to be applied to a camera which can be switched to macro-photography, if metered-distance information indicative of the range in which macro-photography should be selected within the photographic range, the photography readiness indication may be made to immediately blink at a frequency different from 4Hz (and 16Hz) to request the photographer to select lens driving toward a corresponding range.

Yet another embodiment of the operation of the camera of FIG. 1 will be described below with reference to the flowcharts of FIGS. 9(a) and 9(b) which show the operation of the CPU 1.

When the switch SW1 is turned on, for example, by pressing the shutter release button halfway down, the CPU 1 initiates a series of preparatory operations for photography in Step #601. More specifically, in Step #602, the CPU 1 sends a command to the distance metering circuit 2 and causes it to perform the distance metering operation of lighting up the IREDs 3, 4 and 5 at a predetermined frequency and obtaining metered-distance data corresponding to the respective IREDs 3, 4 and 5 from reflected light. In Step #603, the CPU 1 also sends a command to the light metering circuit 9 and causes it to perform the light metering operation of obtaining a subject luminance through the light receiving element 10. Then, in Step #604, in a case where the flash mode is set to the automatic mode in accordance with the setting of the flash-mode setting switch SW6, if it is determined that luminance is low on the basis of the result of the light metering performed in Step #603, the CPU 1 sends a command to the flash circuit 24 to cause it to perform flash charging, and sets the flash photography latch. If the flash mode is set to the manual ON mode, flash charging and setting of the flash photography latch are unconditionally set. If the flash mode is set to the manual OFF mode, the flash photography latch is cleared and no flash charging is performed.

When the aforesaid series of photographic preparatory operations is completed, the CPU 1 supplies, in Step #605, a base current to the transistor 16 to light up the AF-photography readiness LED 13 (hereinafter referred to as the "photography readiness indication"). Thereafter, if it is determined in Step #606 that the red-eye preventing mode has been set by the switch SW7, if it is determined in Step #607 that the flash photography latch has been set, and if it is determined in Step #608 that the metered-light data from the light metering circuit 9, i.e., the subject luminance metered at this time, is less than the predetermined luminance, it is necessary to light up the red eye preventing lamp 28 for later photography. Accordingly, a red-eye-preventing-lamp lighting-up latch is set in Step #609. Then, in Step #610, the CPU 1 actually sends a command to the red-eye-preventing-lamp driving circuit 27 to light up the red-eye preventing lamp 28. In the next step #611, the red-eye preventing timer is started to count the time required to close the pupils of the eyes to a sufficient extent by the flashing of the red-eye preventing lamp 28. Since a release lock is, as explained later, active until the pupils are closed to the sufficient extent, the photography readiness indication is put out in Step #612, and the process proceeds to Step #613.

If it is determined in Step #606 that the red-eye preventing mode has not been set, if it is determined in Step #607 that the flash photography latch has not been set, or if it is determined in Step #608 that the subject luminance is greater than the predetermined luminance, the operations of Steps #609 to #612 are not performed and the process immediately proceeds to Step #613. Accordingly, in this case, the photography readiness indication remains lit.

If the switch SW1 remains on with the shutter release button pressed halfway down, the process proceeds from Step #613 to Step #616, where it is determined whether an AF single-view mode different from an AF wide-view mode for normal photography has been selected, on the basis of the state of the distance-metering view selecting switch SW3. If it is determined that the AF single-view mode has been selected, the process proceeds to Step #617, where the photography readiness indication is made to blink at 16Hz. Then, the process proceeds to Step #620. More specifically, if the AF single-view mode has been selected, the photography readiness indication is made to immediately blink at 16Hz with no wait of a predetermined time even when the red-eye preventing lamp 28 remains lit. In this manner, the photographer can immediately understand that the current photography is in the AF single-view mode, without a release time lag for prevention of a red-eye phenomenon.

If it is determined in Step #616 that a normal photography mode, i.e., an AF wide-view mode, has been selected, the process proceeds to Step #618, where it is determined whether the predetermined time required to close the pupils to the sufficient extent has passed. If it is determined that the predetermined time has not passed, the process proceeds to Step #620. In Step #620, if the shutter release button has not been pressed all the way down to turn on the switch SW2, the process returns to Step #613 and similar operations are repeated. Thereafter, when the aforesaid predetermined time has passed, the process proceeds from Step #618 to Step #619, where the photography readiness indication is again lit up to indicate that photography may be initiated since the pupils have been closed to the sufficient extent, i.e., the release lock has been cancelled.

If it is determined in Step #613 that the switch SW1 has been turned off, the red-eye preventing lamp 28 is put out in Step #614 and the photography readiness indication is put out in Step #615, and the process returns to Step #601.

Then, if the photographer presses the shutter release button all the way down to turn on the switch SW2 with the switch SW1 remaining on, the process proceeds from Step #620 to Step #621, where the photography readiness indication is put out. In the next step #622, it is determined whether the red-eye-preventing-lamp lighting-up latch has been set. If it is determined that the red-eye-preventing-lamp lighting-up latch has been set, the process proceeds to Step #623, where the AF single-view mode has been selected. If the AF single-view mode has been selected, the process proceeds to Step #624, where the photography readiness indication is made to blink at 16Hz to indicate that fact. Then, the process proceeds to Step #625, where it is determined whether a predetermined time has passed from the time the red-eye preventing lamp 28 was lit up. If it is determined in Step #623 that the AF wide-view mode has been selected, the process proceeds to Step #625, where it is determined whether a predetermined time has passed from the time the red-eye preventing lamp 28 was lit up. If it is determined in Step #625 that the predetermined time has not yet passed, the process returns to Step #623 and, subsequently, similar operations are repeated. If it is determined in Step #625 that the predetermined time has passed, the process returns to Step #626, where the red-eye preventing lamp 28 is put out, and the process proceeds to Step #627, where the photography readiness indication is also put out. Then, the process proceeds to a substantial photographic operation. That is to say, in Step #628, the photographic lens is driven to an in-focus position by the lens driving circuit 31. In Step #629, the shutter driving circuit 30 and the flash circuit 24 are activated to control shutter opening and closing operations and to control a flashing operation, respectively. In Step #630, film winding for one frame is performed by the film transporting circuit 32, thereby completing the series of photographic operations.

If it is determined in Step #622 that the red-eye-preventing-lamp lighting-up latch has not been set, the process immediately proceeds from Step #622 to Step #626, where the red-eye preventing lamp 28 is put out, and in the next step #627, the photography readiness indication is put out. Subsequently, photographic operations similar to those described above are carried out.

Figure 10B:
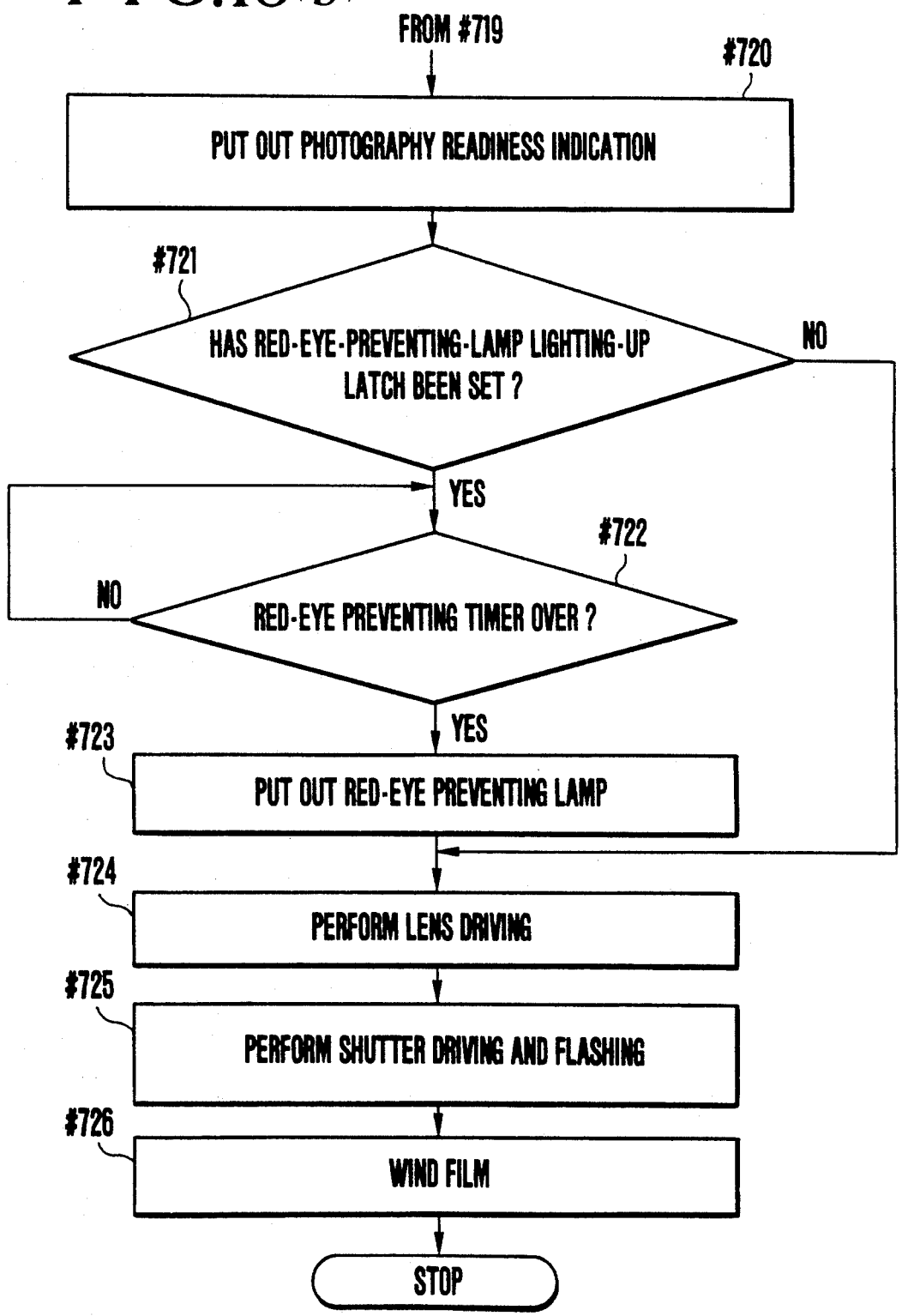

Yet another embodiment of the operation of the camera of FIG. 1 will be described below with reference to the flowcharts of FIGS. 10(a) and 10(b) which show the operation of the CPU 1.

When the switch SW1 is turned on, for example, by pressing the shutter release button halfway down, the CPU 1 initiates a series of preparatory operations for photography (#701). More specifically, the CPU 1 sends a command to the distance metering circuit 2 and causes it to perform the distance metering operation of lighting up the IREDs 3, 4 and 5 at a predetermined frequency and obtaining metered-distance data corresponding to the respective IREDs 3, 4 and 5 from reflected light (#702). The CPU 1 also sends a command to the light metering circuit 9 and causes it to perform a publicly known light metering operation for obtaining a subject luminance through the light receiving element 10 (#703). Then, in Step #704, in a case where the flash mode is set to the automatic mode in accordance with the setting of the flash-mode setting switch SW6, if it is determined that luminance is low on the basis of the result of the light metering performed in Step #703, the CPU 1 sends a command to the flash circuit 24 to cause it to perform flash charging, and sets the flash photography latch. If the flash mode is set to the manual ON mode, flash charging and setting of the flash photography latch are unconditionally set. If the flash mode is set to the manual OFF mode, the flash photography latch is cleared and no flash charging is performed.

When the aforesaid series of photographic preparatory operations is completed, the CPU 1 supplies a base current to the transistor 16 to light up the photography readiness LED 13 (#705). Thereafter, if it is determined that the red-eye preventing mode has been set by the switch SW7 (#706), if it is determined that the flash photography latch has been set in Step #704 (#707), and if it is determined that it is darker than a predetermined luminance (#708), a latch is set which indicates that the red-eye preventing lamp 28 is lit up as red-eye preventing illumination in later photography (#709). Then, the minimum time required to close the pupils to such an extent that a red-eye phenomenon can be prevented by illumination by the red-eye preventing lamp 28, is computed on the basis of the metered-distance data obtained in Step #702 or the current focal-length data on the photographic lens obtained from the zoom-position detecting switches SW12 to SW15 (#710). At the same time that the red-eye preventing lamp 28 is lit up by the red-eye-preventing-lamp driving circuit 27 (#711), the red-eye preventing timer incorporated in the CPU 1 is started (#712). Since a release lock is active, i.e., photography is not possible, the photography readiness indication is put out (#713). Computations on the minimum time of illumination by the red-eye preventing lamp 28 will be described later in detail.

If it is determined from the setting of the switch SW7 that the red-eye preventing mode has not been set (#706), if it is determined that the flash photography latch has not been set (#707), or if it is determined that the metered-light data obtained by the light metering circuit 9 is greater than the predetermined luminance (#708), the operations of Steps #709 to #713 are not performed and the process immediately proceeds to Step #714. Accordingly, in this case, the photography readiness indication remains lit.

If the shutter release button remains pressed halfway down when the above-described operation is completed, the switch SW1 remains on (#714). In this state, if the red-eye preventing timer counts the above-computed minimum predetermined time required to prevent a red-eye phenomenon (#717), the pupils are closed by the flashing of the red-eye preventing lamp 28 to such an extent that the red-eye phenomenon is sufficiently prevented. Accordingly, subsequently, photography is possible at any time and the photography readiness indication LED 13 is again lit up (#718). If the red-eye preventing lamp 28 has not been lit, the photography readiness indication LED 13 has already been lit, and no variation in operation occurs. At this time, if the shutter release button is released (#714), the red-eye preventing lamp 28 is put out (#715) and the photography readiness indication LED 13 is put out (#716). The process returns to Step #701, where the process waits for the switch SW1 to be turned on (#701).

While the switch SW1 remains on (#714), if the shutter release button is pressed all the way down to turn on the switch SW2 (#719), the photography readiness indication is put out (#720) and the state of the red-eye-preventing-lamp lighting-up latch is checked (#721). If it is determined that the red-eye-preventing-lamp lighting-up latch has been set, that is, if the time counted by the red-eye preventing timer from the start of lighting of the red-eye preventing lamp 28 is within the above-computed predetermined time, the process waits for the red-eye preventing timer to count up the computed predetermined time (#722). In other words, in a case where red-eye preventing illumination is needed, even if the switches SW1 and SW2 are turned on by the quick depression of the shutter release button, a release time lag will occur for a certain predetermined interval. After the red-eye preventing timer has counted the aforesaid predetermined time, the red-eye preventing lamp 28 is put out (#723) and the photographic lens is driven to an in-focus position by the lens driving circuit 31 on the basis of the metered-distance data provided by the distance metering circuit 2 (#724). Then, the shutter driving circuit 30 is activated to open a shutter, thereby effecting an exposure operation. At this time, if the flash photography latch has been set, flashing is effected by the flash circuit 24 (#725). After the completion of the exposure operation, film winding for one frame is performed by the film transporting circuit 32 (#726).

The following is an explanation of the computations of Step #110 which are performed on the aforesaid predetermined time to be counted by the red-eye preventing timer. In this embodiment, metered-distance data is divided into 21 segments, and corresponding time periods to be counted by the red-eye preventing timer are shown in Table 1. As can be seen from Table 1, if a subject is located at a long distance, a flash unit and a photographic optical axis are approximately parallel to each other, so that a red-eye phenomenon occurs most easily. However, since flash light does not reach the subject, it is not necessary to perform a red-eye preventing operation. If the subject is located at a short distance, the intensity of flash light increases, but a certain angle is made between the flash unit and the photographic optical axis, so that the red-eye phenomenon is substantially prevented. Accordingly, in the case of metered-distance data indicative of 15 m, the lighting-up time of the red-eye preventing timer is set to 0 seconds and it is, therefore, possible to perform photography without a release time lag. (In this case as well, if the switch SW1 remains pressed down, the red eye preventing lamp 28 is lit up.) In the case of metered-distance data indicative of 2 m, the lighting-up time of the red-eye preventing timer is set to 1.5 seconds, and even if the switches SW1 and SW2 are quickly pressed, a release lock works for 1.5 seconds. Since the red-eye preventing lamp 28 is lit up for that time, the pupils are closed to a sufficient extent, whereafter exposure is carried out. Accordingly, photography in which a red-eye phenomenon is prevented can be accomplished. In the case of metered-distance data indicative of 0.94 m, since red eyes do not easily occur, the lighting-up time of the red-eye preventing timer is set to 0.4 seconds, so that it is possible to perform photography with a release time lag of 0.4 seconds, shorter than a conventional release time lag of 1.5 seconds. As long as the switch SW1 is on, the red-eye preventing lamp 28 continues to be lit. Accordingly, particularly when a person susceptible to the red-eye phenomenon is to be photographed, the switch SW2 may be turned on when a sufficient time period passes after the switch SW1 has been turned on.

TABLE 1

| | DISTANCE | TIME TO BE COUNTED BY RED-EYE PREVENTING TIMER |
|---|---|---|
| 1 | INFINITY | 0 sec |
| 2 | 15.2 m | 0 sec |
| 3 | 8.3 m | 1 sec |
| 4 | 5.7 m | 1.5 sec |
| 5 | 4.3 m | 1.5 sec |
| 6 | 3.5 m | 1.5 sec |
| 7 | 3.0 m | 1.5 sec |
| 8 | 2.55 m | 1.5 sec |
| 9 | 2.24 m | 1.5 sec |
| 10 | 2.01 m | 1.5 sec |
| 11 | 1.81 m | 1.5 sec |
| 12 | 1.66 m | 1.5 sec |
| 13 | 1.52 m | 1.5 sec |
| 14 | 1.41 m | 1.4 sec |
| 15 | 1.32 m | 1.3 sec |
| 16 | 1.23 m | 1.2 sec |
| 17 | 1.16 m | 1.1 sec |
| 18 | 1.10 m | 1.0 sec |
| 19 | 1.04 m | 0.8 sec |
| 20 | 0.99 m | 0.6 sec |
| 21 | 0.94 m | 0.4 sec |

The following is an explanation of the focal length of the photographic lens and the minimum lighting-up time of the red-eye preventing lamp 28. As the focal length of the photographic lens increases, the portion of a photographed picture occupied by a red-eye phenomenon increases and an extremely impaired picture may result. Accordingly, as shown in Table 2, if the zoom-position detecting switches SW12, SW13, SW14 and SW15 for indicating the focal length of the photographic lens are in the state of, for example, "0, 0, 0, 0", this indicates that a focal length of 35 mm has been selected. Since the portion occupied by the pupils is small with respect to the field angle corresponding to 35 mm, the red eye preventing timer is set to 0.5 seconds. If the zoom-position detecting switches SW12, SW13, SW14 and SW15 are in the state of, for example, "0, 1, 1, 0", this indicates that a focal length of 95 mm has been selected. In this case, the red-eye preventing timer is set to 1.5 seconds as the time required to close the pupils to a sufficient extent.

TABLE 2

| | FOCAL LENGTH OF PHOTOGRAPHIC LENS | TIME TO BE COUNTED BY RED-EYE PREVENTING TIMER | ZOOM SWITCHES SW12, SW13, SW14 AND SW15 |
|---|---|---|---|
| 1 | 35 mm | 0.5 sec | 0000 |
| 2 | 45 mm | 0.7 sec | 0001 |
| 3 | 55 mm | 0.9 sec | 0010 |
| 4 | 65 mm | 1.1 sec | 0011 |
| 5 | 75 mm | 1.3 sec | 0100 |
| 6 | 85 mm | 1.5 sec | 0101 |
| 7 | 95 mm | 1.5 sec | 0110 |
| 8 | 105 mm | 1.5 sec | 0111 |

Table 3 shows an example in which the lengths of time to be counted by the red-eye preventing timer are set on the basis of combinations of the focal lengths of the photographic lens and distance data. The vertical axis represents the distance data and the horizontal axis represents focal-length data on the photographic lens. For example, if the distance data is 12 which corresponds to 1.66 m and the lens focal length is 4 which corresponds to 65 mm, the red-eye preventing timer is set to 1.3 seconds. During this time, even if the switches SW1 and SW2 are quickly pressed, the red-eye preventing lamp 28 is lit up for 1.3 seconds, so that it is possible to carry out a shutter release after the pupils have been closed to such an extent that a red-eye phenomenon can be sufficiently prevented.

Needless to say, the method of setting time to be counted by the red-eye preventing timer may be freely selected from the aforesaid methods as required.

TABLE 3

| | 1 | 2 | 3 | 4 | 5 | 6 | 7 | 8 |
|---|---|---|---|---|---|---|---|---|
| 1 | 0 (sec) | 0 | 0 | 0 | 0 | 0 | 0 | 0 |
| 2 | 0 | 0 | 0 | 0 | 0 | 0 | 0 | 0 |
| 3 | 0.4 | 0.5 | 0.7 | 0.8 | 0.9 | 1 | 1 | 1 |
| 4 | 1.0 | 1.1 | 1.2 | 1.3 | 1.4 | 1.5 | 1.5 | 1.5 |
| 5 | 1.0 | 1.1 | 1.2 | 1.3 | 1.4 | 1.5 | 1.5 | 1.5 |
| 6 | 1.0 | 1.1 | 1.2 | 1.3 | 1.4 | 1.5 | 1.5 | 1.5 |
| 7 | 1.0 | 1.1 | 1.2 | 1.3 | 1.4 | 1.5 | 1.5 | 1.5 |
| 8 | 1.0 | 1.1 | 1.2 | 1.3 | 1.4 | 1.5 | 1.5 | 1.5 |
| 9 | 1.0 | 1.1 | 1.2 | 1.3 | 1.4 | 1.5 | 1.5 | 1.5 |
| 10 | 1.0 | 1.1 | 1.2 | 1.3 | 1.4 | 1.5 | 1.5 | 1.5 |
| 11 | 1.0 | 1.1 | 1.2 | 1.3 | 1.4 | 1.5 | 1.5 | 1.5 |
| 12 | 1.0 | 1.1 | 1.2 | 1.3 | 1.4 | 1.5 | 1.5 | 1.5 |
| 13 | 1.0 | 1.1 | 1.2 | 1.3 | 1.4 | 1.5 | 1.5 | 1.5 |
| 14 | 0.9 | 1.0 | 1.1 | 1.2 | 1.3 | 1.4 | 1.4 | 1.4 |
| 15 | 0.8 | 0.9 | 1.0 | 1.1 | 1.2 | 1.3 | 1.3 | 1.3 |
| 16 | 0.7 | 0.8 | 0.9 | 1.0 | 1.1 | 1.2 | 1.2 | 1.2 |
| 17 | 0.6 | 0.7 | 0.8 | 0.9 | 1.0 | 1.1 | 1.1 | 1.1 |

TABLE 3-continued

| 1 | 2 | 3 | 4 | 5 | 6 | 7 | 8 |
|---|---|---|---|---|---|---|---|
| 18 | 0.5 | 0.6 | 0.7 | 0.8 | 0.9 | 1.0 | 1.0 | 1.0 |
| 19 | 0.5 | 0.5 | 0.6 | 0.7 | 0.8 | 0.9 | 0.9 | 0.9 |
| 20 | 0.5 | 0.5 | 0.5 | 0.6 | 0.7 | 0.8 | 0.8 | 0.8 |
| 21 | 0.5 | 0.5 | 0.5 | 0.5 | 0.6 | 0.7 | 0.7 | 0.7 |

Figure 11B:
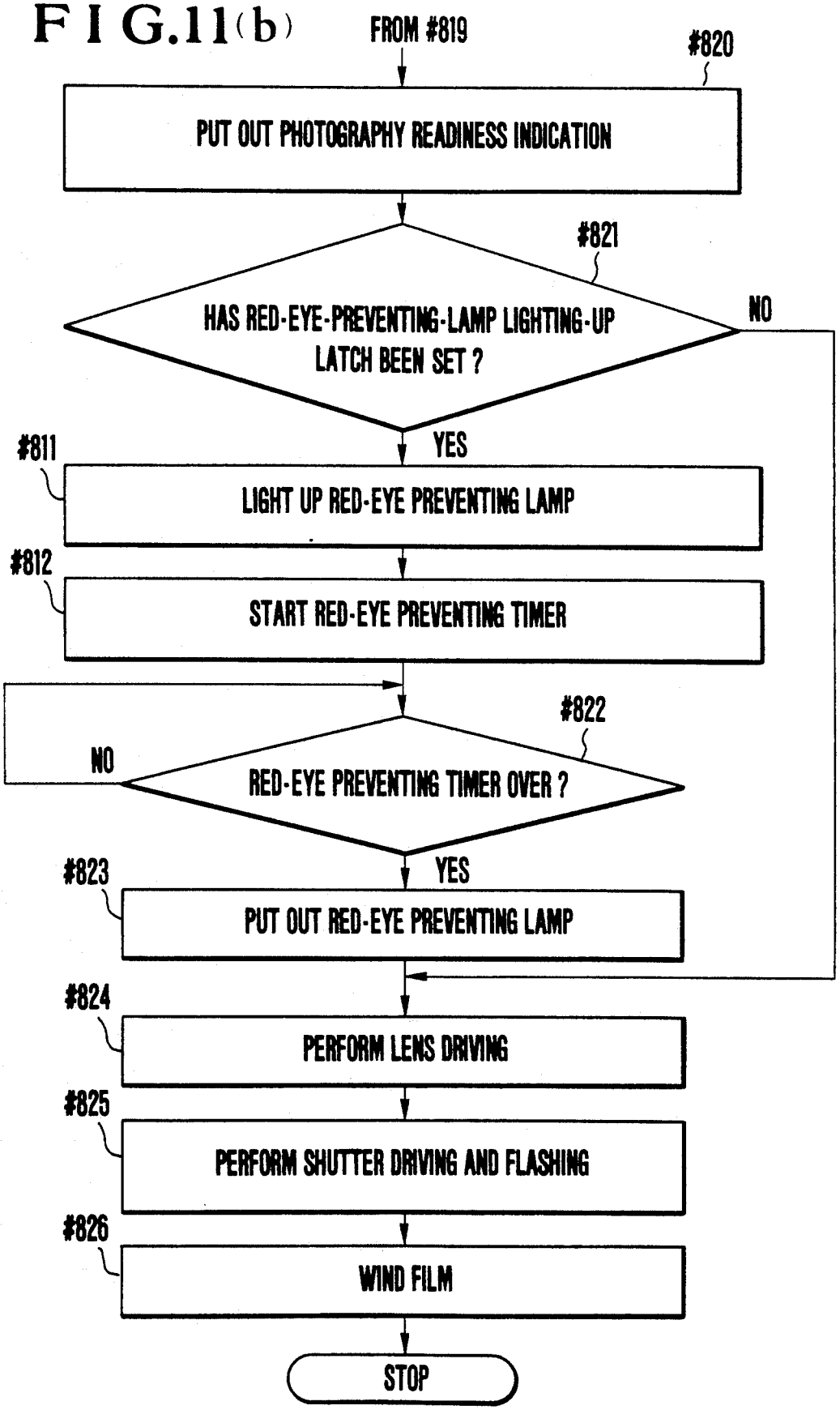

Yet another embodiment of the operation of the camera of FIG. 1 will be described below with reference to the flowcharts of FIGS. 11(a) and 11(b) which show the operation of the CPU 1.

In this embodiment, after the switches SW1 and SW2 have been turned on, the red-eye preventing lamp 28 is lit up for a predetermined time and photography is performed. The operations of Steps #801 to #826 are basically the same as those of Steps #701 to #726 shown in FIGS. 10(a) and 10(b). In the embodiment shown in FIGS. 10(a) and 10 described above, the red-eye preventing lamp 28 is lit up after the completion of the photographic preparatory operation (#711), and the time counting operation of the red-eye preventing timer is started. However, in the embodiment shown in FIGS. 11(a) and 11(b), after the switch SW2 has been turned on, the red-eye preventing lamp 28 is lit up (#811) and the red-eye preventing timer is started (#812). As described above, the time to be counted by the red-eye preventing timer is a minimum duration of seconds to prevent the red-eye phenomenon, which is determined by distance data or focal-length data on the photographic lens.

As is apparent from the foregoing description, according to each of the embodiments explained in connection with FIGS. 1 to 7, by lighting up red-eye preventing illumination within the time counted by a self-timer or a time lag of predetermined time period in a remote-controlled shutter release operation, it is possible to achieve a red-eye preventing effect without providing an excessive release time lag. In addition, whether the red-eye preventing illumination is lit up or not, the operating time of the self-timer or that in a remote-controlled shutter release mode does not vary.

According to each of the embodiments shown in FIGS. 4(a), 4(b) and 4(a) to 11(a) and 11(b), at the same time that the red-eye preventing lamp 28 is lit up, the photography readiness indication is once put out, and after the predetermined time required to close the pupils to a sufficient extent has passed, the photography readiness indication is again lit up. Accordingly, it is possible to confirm at a glance until what time a release lock was active. Also, since it is expected that the switch SW2 is turned on immediately after such an indication has been confirmed, it is possible to implement a camera which ensures that many shutter opportunities can be taken as compared with a conventional camera whose release lock time cannot be checked.

In addition, an arrangement is adopted in which if a person hurriedly turns on the release switches SW1 and SW2 during a release lock while the red-eye preventing lamp is lit up, a shutter release operation is performed when a predetermined time has passed not from the time the switch SW2 is turned on but from the time the lighting-up of the red-eye preventing lamp 28 is started. Accordingly, photography in which the red-eye phenomenon is substantially prevented can be performed in the minimum required time. In addition, if a flow is partially modified as shown in FIG. 7, it becomes possible to indicate at what time the ON operation of the switch SW2 was accepted. Accordingly, it is possible to perform photography for preventing the red-eye phenomenon without hesitation.

In each of the embodiments shown in each of FIGS. 4(a), 4(b) and 4(c) to 7, if the remote-control mode or the self-timer photography mode is set, the lighting-up time of the red-eye preventing lamp 28 for preventing the red-eye phenomenon can be inserted before the time at which a shutter release is initiated in the set mode. Accordingly, since the photography readiness indication remains lit, it is possible for a photographer to pose at ease prior to the start of remote-controlled photography or self-timer photography. (If the photography readiness indication has been put out, the photographer may be afraid that no correct photography can be performed.)

According to the embodiment shown in FIGS. 8(a) and 8(b), in an arrangement in which the photography readiness indication is inhibited from being lit up during a release lock time while the red-eye preventing lamp 28 remains lit, if metered-distance information is obtained which should be immediately supplied to a photographer (in the embodiment, if close-distance information is obtained which indicates that correct photography is not expected), the photography readiness indication is made to blink at 4Hz even during the aforesaid release lock time, thereby informing the photographer of that fact. Accordingly, the photographer can immediately obtain the required information without waiting for a predetermined time, and can proceed to the next photographic operation without an unnecessary waiting time. It is also possible to prevent loss of a shutter opportunity.

In the case of a close-distance warning which means that a red-eye phenomenon does not easily occur, such a close-distance warning is immediately issued to inform the photographer of that fact and a release lock is cancelled. Accordingly, the photographer is not annoyed with an excessive time lag.

Figure 9B:
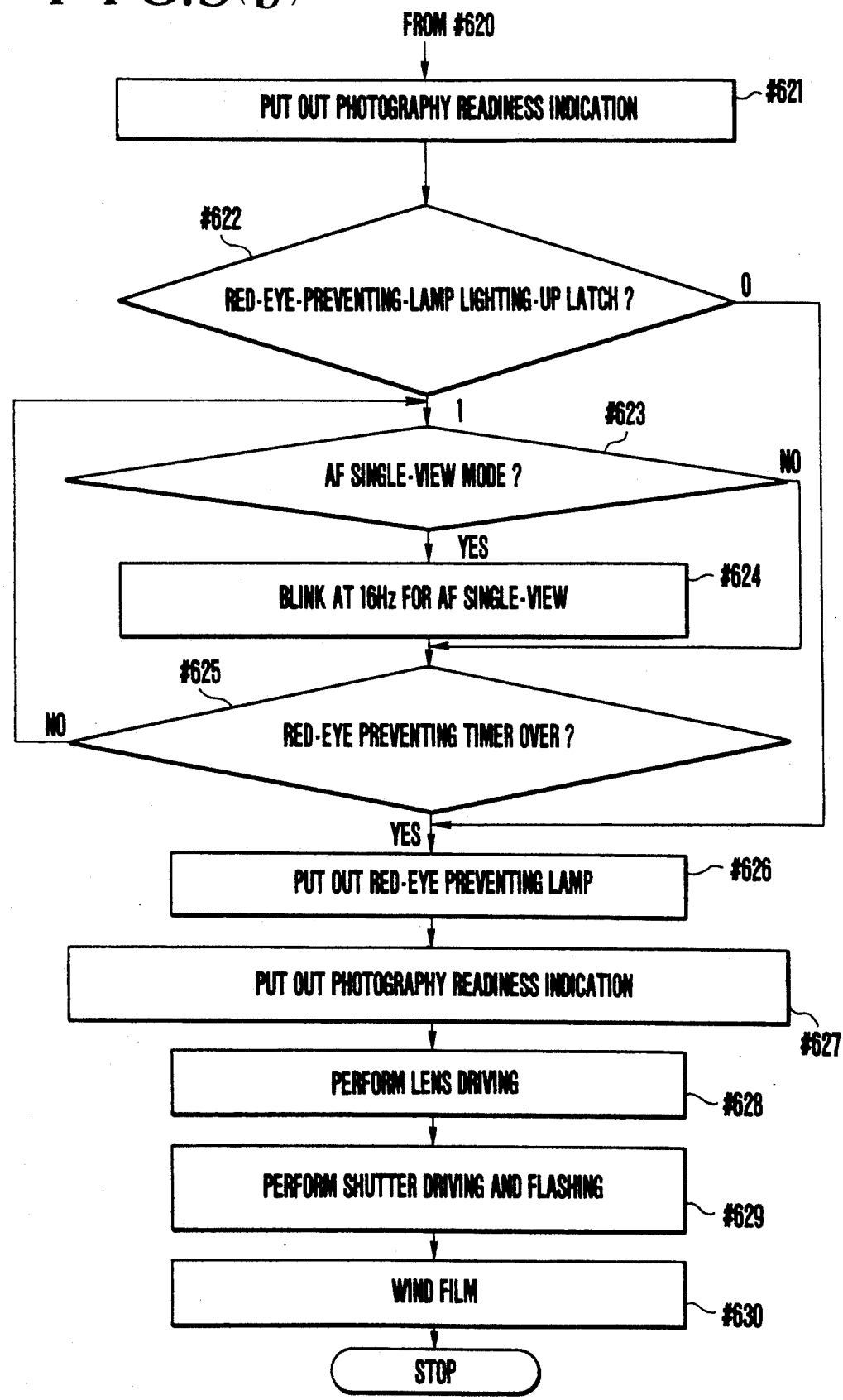

In the embodiment shown in FIGS. 9(a) and 9(b), if not a normal AF wide-view mode but the AF single-view mode has been selected by a predetermined switching operation, the photography readiness indication is made to blink at 16Hz to immediately inform the photographer of that fact. Accordingly, it is possible to confirm the fact even during a release lock time in which the red-eye preventing lamp 28 remains lit, and the photographer can perform flash photography at ease while achieving a sufficient red-eye preventing effect.

In each of the embodiments shown in FIGS. 10(a), 10(b) and 11(a), 11(b), the minimum lighting-up time of the red-eye preventing lamp is determined while taking into account metered-distance data, focal-distance data on a photographic lens, or both. Accordingly, it is possible to achieve photography in which a red-eye phenomenon is sufficiently prevented without waiting for an excessive release time lag.

Although in the description of each of the embodiments the camera using a film as image recording means is shown as one example, the present invention can be applied to other image recording means such as a video camera or an electronic still camera.

What is claimed is:

1. A red-eye preventing device for preventing a red-eye phenomenon by projecting red-eye preventing illumination light onto a subject prior to execution of flash photography, comprising:

(A) time counting means for counting a predetermined time required to attain a red-eye preventing effect by the red-eye preventing illumination light;

(B) inhibiting means for inhibiting a camera from proceeding to a photographic operation until said time counting means completes counting the predetermined time; and (C) setting means for setting the predetermined time to be counted by said time counting means in accordance with the kind of photographic mode of the camera so as to shorten a release time lag.

2. A device according to claim 1, further comprising red-eye preventing illuminating means for projecting the red-eye preventing illumination light.

3. A device according to claim 1, further comprising flashing means for effecting the flash photography.

4. A device according to claim 1, wherein said setting means includes means for permitting incorporation of the predetermined time into a part of a self-timer time to be set in a self-timer photography mode.

5. A device according to claim 1, wherein said setting means includes means for permitting incorporation of the predetermined time into a part of a remote-control delay time to be set in a remote-controlled photography mode.

6. A device according to claim 5, wherein said setting means includes means for setting the predetermined time upon reception of a remote-control signal if the remote-control delay time has not been set in the remote-controlled photography mode.

7. A device according to claim 5, wherein said setting means includes means for setting as the predetermined time a time which is shorter than that set in a case where the remote-control delay time has been set, if the remote-control delay time has not been set in the remote-controlled photography mode.

8. A device according to claim 1, further comprising means for continuing to project the red-eye preventing illumination light even after said time counting means has completed counting the predetermined time.

9. A device according to claim 1, wherein said setting means includes means for setting the predetermined time in accordance with a subject distance.

10. A device according to claim 1, wherein said setting means includes means for setting the predetermined time to a short time if a subject distance is short.

11. A device according to claim 1, wherein said setting means includes means for setting the predetermined time to a long time if a subject distance is medium.

12. A device according to claim 1, wherein said setting means includes means for setting the predetermined time to a short time if a subject distance is long.

13. A device according to claim 1, wherein said setting means includes means for setting the predetermined time to a time which is shorter than that set for a medium subject distance, if the subject distance is short or long.

14. A device according to claim 1, wherein said setting means includes means for setting the predetermined time in accordance with the focal length of a photographic optical system.

15. A device according to claim 1, wherein said setting means includes means for setting the predetermined time to a shorter time as the focal length of a photographic optical system becomes shorter.

16. A device according to claim 1, wherein said setting means includes means for setting the predetermined time to a longer time as the focal length of a photographic optical system becomes longer.

17. A device according to claim 1, wherein said time counting means further includes indicating means for providing an indication that said time counting means has not yet completed counting the predetermined time.

18. A device according to claim 17, wherein said indicating means includes means for putting out a photography readiness indication.

19. A device according to claim 18, wherein said indicating means includes means for providing a close-distance warning indication even in a case where the photography readiness indication is put out.

20. A device according to claim 18, wherein said indicating means includes means for providing an autofocus view indication even in a case where the photography readiness indication is put out.

21. A camera according to claim 1, further comprising means for preventing operation of said inhibiting means if a subject distance is close.

22. A red-eye preventing device for preventing a red-eye phenomenon by projecting red-eye preventing illumination light onto a subject prior to execution of flash photography, comprising:

(A) time counting means for counting a predetermined time required to attain a red-eye preventing effect by the red-eye preventing illumination light;

(B) inhibiting means for inhibiting a camera from proceeding to a photographic operation until said time counting means completes counting the predetermined time; and (C) indicating means for providing an indication that said time counting means has not yet completed counting the predetermined time, in accordance with the kind of photographic mode of the camera.

23. A device according to claim 22, wherein said indicating means includes means for inhibiting operation of said indicating means if a self-timer photography mode is active.

24. A device according to claim 22, wherein said indicating means includes means for inhibiting operation of said indication means if a remote-controlled photography mode is active.

25. A device according to claim 22, wherein said indicating means includes means for putting out a photography readiness indication.

26. A device according to claim 25, wherein said indicating means includes means for inhibiting the photographic readiness indication from being put out, if a self-timer photography mode is active.

27. A device according to claim 25, wherein said indicating means includes means for inhibiting the photographic readiness indication from being put out, if a remote-controlled photography mode is active.

28. A device according to claim 25, wherein said indicating means includes means for providing a close-distance warning indication even in a case where the photography readiness indication is put out.

29. A device according to claim 25, wherein said indicating means includes means for providing an autofocus view indication even in a case where the photography readiness indication is put out.

30. A red-eye preventing device for preventing a red-eye phenomenon by projecting red-eye preventing illumination light onto a subject prior to execution of flash photography, comprising:

(A) means for initiating projection of the red-eye preventing illumination light onto the subject;

(B) time counting means for counting a predetermined time required to attain a red-eye preventing effect by the red-eye preventing illumination light;

(C) inhibiting means for inhibiting a camera from proceeding to a photographic operation until said time counting means completes counting the predetermined time; and (D) indicating means for providing an indication that said time counting means has not yet completed counting the predetermined time.

31. A device according to claim 30, wherein said indicating means includes means for putting out a photography readiness indication.

32. A device according to claim 31, wherein said indicating means includes means for providing a close-distance warning indication even in a case where the photography readiness indication is put out.

33. A device according to claim 31, wherein said indicating means includes means for providing an autofocus view indication even in a case where the photography readiness indication is put out.

34. A red-eye preventing device according to claim 30, wherein said inhibiting means inhibits the photographic operation of the camera until said time counting means completes counting the predetermined time even if an operation member for starting the photographic operation is operated.

35. A red-eye preventing device according to claim 30, wherein said time counting means starts the time counting in response to operation of an operation member for preparation of photography.

36. A camera having a red-eye preventing device for preventing a red-eye phenomenon by projecting red-eye preventing illumination light onto a subject prior to execution of flash photography, comprising:

(A) time counting means for counting a predetermined time required to attain a red eye preventing effect by the red-eye preventing illumination light;

(B) inhibiting means for inhibiting the camera from proceeding to a photographic operation until said time counting means completes counting the predetermined time; and (C) setting means for setting the predetermined time to be counted by said time counting means in accordance with the kind of photographic mode of the camera so as to shorten a release time lag.

37. A camera according to claim 36, further comprising red-eye preventing illuminating means for projecting the red-eye preventing illumination light.

38. A camera according to claim 36, further comprising flashing means for effecting the flash photography.

39. A camera according to claim 36, wherein said setting means includes means for permitting incorporation of the predetermined time into a part of a self-timer time to be set in a self-timer photography mode.

40. A camera according to claim 36, wherein said setting means includes means for permitting incorporation of the predetermined time into a part of a remote-control delay time to be set in a remote-controlled photography mode.

41. A camera according to claim 40, wherein said setting means includes means for setting the predetermined time upon reception of a remote-control signal if the remote-control delay time has not been set in the remote. controlled photography mode.

42. A camera according to claim 40, wherein said setting means includes means for setting as the predetermined time a time which is shorter than that set in a case where the remote-control delay time has been set, if the remote-control delay time has not been set in the remote-controlled photography mode.

43. A camera according to claim 36, further comprising means for continuing to project the red-eye preventing illumination light even after said time counting means has completed counting the predetermined time.

44. A camera according to claim 36, wherein said setting means includes means for setting the predetermined time in accordance with a subject distance.

45. A camera according to claim 36, wherein said setting means includes means for setting the predetermined time to a short time if a subject distance is short.

46. A camera according to claim 36, wherein said setting means includes means for setting the predetermined time to a long time if a subject distance is medium.

47. A camera according to claim 36, wherein said setting means includes means for setting the predetermined time to a short time if a subject distance is long.

48. A camera according to claim 36, wherein said setting means includes means for setting the predetermined time to a time which is shorter than that set for a medium subject distance, if the subject distance is short or long.

49. A camera according to claim 36, wherein said setting means includes means for setting the predetermined time in accordance with the focal length of a photographic optical system.

50. A camera according to claim 36, wherein said setting means includes means for setting the predetermined time to a shorter time as the focal length of a photographic optical system becomes shorter.

51. A camera according to claim 36, wherein said setting means includes means for setting the predetermined time to a longer time as the focal length of a photographic optical system becomes longer.

52. A camera according to claim 36, wherein said time counting means further includes indicating means for providing an indication that said time counting means has not yet completed counting the predetermined time.

53. A camera according to claim 52, wherein said indicating means includes means for putting out a photography readiness indication.

54. A camera according to claim 53, wherein said indicating means includes means for providing a close. distance warning indication even in a case where the photography readiness indication is put out.

55. A camera according to claim 53, wherein said indicating means includes means for providing an autofocus view indication even in a case where the photography readiness indication is put out.

56. A camera according to claim 36, further comprising means for preventing operation of said inhibiting means if a subject distance is close.

57. A camera having a red-eye preventing device for preventing a red-eye phenomenon by projecting red-eye preventing illumination light onto a subject prior to execution of flash photography, comprising:

(A) time counting means for counting a predetermined time required to attain a red-eye preventing effect by the red-eye preventing illumination light;

(B) inhibiting means for inhibiting the camera from proceeding to a photographic operation until said time counting means completes counting the predetermined time; and (C) indicating means for providing an indication that said time counting means has not yet completed counting the predetermined time, in accordance with the kind of photographic mode of the camera.

58. A camera according to claim 57, wherein said indicating means includes means for inhibiting operation of said indicating means if a self-timer photography mode is active.

59. A camera according to claim 57, wherein said indicating means includes means for inhibiting operation of said indication means if a remote-controlled photography mode is active.

60. A camera according to claim 57, wherein said indicating means includes means for putting out a photography readiness indication.

61. A camera according to claim 60, wherein said indicating means includes means for inhibiting the photographic readiness indication from being put out, if a self-timer photography mode is active.

62. A camera according to claim 60, wherein said indicating means includes means for inhibiting the photographic readiness indication from being put out, if a remote-controlled photography mode is active.

63. A camera according to claim 60, wherein said indicating means includes means for providing a close-distance warning indication even in a case where the photography readiness indication is put out.

64. A camera according to claim 60, wherein said indicating means includes means for providing an autofocus view indication even in a case where the photography readiness indication is put out.

65. A camera having a red-eye preventing device for preventing a red-eye phenomenon by projecting red-eye preventing illumination light onto a subject prior to execution of flash photography, comprising:
   (A) means for initiating projection of the red-eye preventing illumination light onto the subject;
   (B) time counting means for counting a predetermined time required to attain a red-eye preventing effect by the red-eye preventing illumination light;
   (C) inhibiting means for inhibiting the camera from proceeding to a photographic operation until said time counting means completes counting the predetermined time; and
   (D) indicating means for providing an indication that said time counting means has not yet completed counting the predetermined time.

66. A camera according to claim 65, wherein said indicating means includes means for putting out a photography readiness indication.

67. A camera according to claim 66, wherein said indicating means includes means for providing a close-distance warning indication even in a case where the photography readiness indication is put out.

68. A camera according to claim 66, wherein said indicating means includes means for providing an autofocus view indication even in a case where the photography readiness indication is put out.

69. A red-eye preventing device according to claim 65, wherein said inhibiting means inhibits the photographic operation of the camera until said time counting means completes counting the predetermined time even if an operation member for starting the photographic operation is operated.

70. A red-eye preventing device according to claim 65, wherein said time counting means starts the time counting in response to operation of an operation member for preparation of photography.

* * * * *